(12) United States Patent
Shreeves-Taylor

(10) Patent No.: US 12,100,037 B2
(45) Date of Patent: Sep. 24, 2024

(54) CREATIVE CONTENT INTERFACE SYSTEM, METHOD, AND MANUFACTURE

(71) Applicant: Jona Shreeves-Taylor, Philadelphia, PA (US)

(72) Inventor: Jona Shreeves-Taylor, Philadelphia, PA (US)

( * ) Notice: Subject to any disclaimer, the term of this patent is extended or adjusted under 35 U.S.C. 154(b) by 136 days.

(21) Appl. No.: 17/711,251

(22) Filed: Apr. 1, 2022

(65) Prior Publication Data

US 2022/0318889 A1    Oct. 6, 2022

Related U.S. Application Data

(60) Provisional application No. 63/169,435, filed on Apr. 1, 2021.

(51) Int. Cl.
*G06Q 30/00* (2023.01)
*G06Q 30/0601* (2023.01)
*G06Q 30/08* (2012.01)
*G07F 17/32* (2006.01)

(52) U.S. Cl.
CPC ......... *G06Q 30/0641* (2013.01); *G06Q 30/08* (2013.01); *G07F 17/3272* (2013.01)

(58) Field of Classification Search
CPC ...... G06Q 30/0601–0645; G06Q 30/08; G07F 17/3272
USPC ................................................. 705/26.1–27.2
See application file for complete search history.

(56) References Cited

U.S. PATENT DOCUMENTS

| | | | |
|---|---|---|---|
| 2004/0158502 A1* | 8/2004 | Adams ................... | G06Q 30/02 705/26.2 |
| 2009/0248542 A1* | 10/2009 | Houvener .......... | G06Q 30/0601 705/26.1 |
| 2014/0222607 A1* | 8/2014 | Drouin ............... | G06Q 30/0643 705/26.25 |
| 2015/0310697 A1* | 10/2015 | O'Hagan .............. | G07F 17/329 463/17 |
| 2018/0330432 A1* | 11/2018 | Mazor ..................... | H04L 67/12 |
| 2022/0261883 A1* | 8/2022 | Miller ................ | G06Q 30/0641 |

OTHER PUBLICATIONS

Mahany, Alexander "Ebay launches its live auction platform," Oct. 6, 2014, artnews.com, accessed at [https://www.artnews.com/art-news/market/ebay-launches-its-live-auction-platform-2894/] (Year: 2014).*

* cited by examiner

*Primary Examiner* — Jeffrey A. Smith
*Assistant Examiner* — Lindsey B Smith
(74) *Attorney, Agent, or Firm* — McCarter & English, LLP

(57) ABSTRACT

Exemplary embodiments are directed to a creative content interface system. The system includes first and second electronic devices, each including a graphical user interface, a non-transitory computer-readable medium, and a processing device. The system includes a database in electronic communication with the first and second electronic devices. The database is configured to electronically store user registration data and creative content data. The first processing device is configured to add creative content to the creative content data, interact with the creative content added to the creative content data, and transmit electronic correspondence between the first and second electronic devices.

13 Claims, 39 Drawing Sheets

CREATIVE CONTENT INTERFACE SYSTEM, METHOD, AND MANUFACTURE

This application claims the benefit of U.S. Provisional Patent Application No. 63/169,435, which was filed on Apr. 1, 2021. The entire content of the foregoing provisional application is incorporated herein by reference.

TECHNICAL FIELD

Technical Field

The present disclosure relates to a creative content interface system and, in particular, to a creative content interface system that provides an interface for selling creative content and interacting with individuals regarding the creative content.

Background

It may be difficult for artists, particularly independent artists, to achieve the desired exposure for their creative content, such as artwork and/or music. Although social media has become a popular means for displaying creative content worldwide, social media generally does not provide convenient means for selling the creative content. Art galleries can be used to sell creative content. However, it may be difficult to have creative content displayed at an art gallery and, once displayed, the art gallery typically requests a large portion of the profits from the sale. Selling creative content using traditional means while having control of how the sale would occur can therefore be problematic, especially for up-and-coming artists.

Thus, a need exists for a creative content interface system that provides for promotion of creative content and control over how creative content is sold. These and other needs are addressed by the creative content interface system of the present disclosure.

SUMMARY

In accordance with embodiments of the present disclosure, an exemplary creative content interface system is provided. The creative content interface system includes means for uploading or adding electronic representations of the creative content to the system, and means for marketing or selling the creative content to users associated with the system. The system includes customizable features that provide greater control to the user/creator of the creative content, as compared to traditional systems. As an example, the user/creator can set customized time periods for an auction transaction to take place, users/buyers can input offers with a customized countdown that limits the time period during which the officer can be accepted, and retraction of the offer at any time is permitted. The system includes a challenge interface that provides for electronic selection of the preferred creative content, and real-time internal ranking of the creative content relative to other similar creative content. The system therefore provides an improved means for marketing and selling creative content.

In accordance with embodiments of the present disclosure, an exemplary creative content interface system is provided. The system includes a first electronic device including a first graphical user interface, a first non-transitory computer-readable medium, and a first processing device. The system includes a second electronic device including a second graphical user interface, a second non-transitory computer-readable medium, and a second processing device. The system includes a database in electronic communication with the first and second electronic devices. The database is configured to electronically store user registration data and creative content data. The first processing device is configured to execute instructions stored in the first non-transitory computer-readable medium and the second processing device is configured to execute instructions stored in the second non-transitory computer-readable medium to add creative content to the creative content data, interact with the creative content added to the creative content data, and transmit electronic correspondence between the first and second electronic devices.

In some embodiments, the creative content includes at least one of a painting, a drawing, an audio recording, a video recording. In some embodiments, the creative content data includes an electronic image of visual creative content or audio creative content, a title associated with the creative content, and a description of the creative content. In some embodiments, interacting with the creative content added to the creative content data includes executing a transaction module to establish a transaction type for selling the creative content. In some embodiments, the transaction type is an auction, a set price, a raffle, or a price play.

In some embodiments, if the transaction type is the auction, the first or second processing device is configured to execute instructions in the first or second non-transitory computer-readable medium to input a customized time period for a length of the auction. In such embodiments, the customized time period is independently selected and input by a user selling the creative content.

In some embodiments, if the transaction type is the raffle, the first or second processing device is configured to execute instructions in the first or second non-transitory computer-readable medium to select a winner of the raffle via an anonymous selection interface. In such embodiments, the anonymous selection interface can be a lightning selection with the first or second processing device anonymously selecting a winner from a list of users who electronically entered the raffle. In such embodiments, the anonymous selection interface can be a grid selection with a blurred or hidden anonymous representation of users who electronically entered the raffle, and selection of one of the users from the grid selection is permitted via the first or second graphical user interface.

In some embodiments, if the transaction type is the auction, the first or second processing device is configured to execute instructions in the first or second non-transitory computer-readable medium to input a max out bid for the creative content, the max out bid bypassing incremental bidding on the creative content and automatically increasing a current bid for the creative content to a dollar amount associated with the max out bid.

In some embodiments, if the transaction type is the auction, the price play, or the set price, the first or second processing device is configured to execute instructions in the first or second non-transitory computer-readable medium to input an offer for the creative content, the offer including a countdown associated with the offer. In such embodiments, the countdown sets a time period during which the offer input for the creative content is valid. If the offer input for the creative content is not accepted, upon completion of the time period, the offer input for the creative content is automatically revoked.

In some embodiments, interacting with the creative content added to the creative content data includes executing a challenge module to initiate a competition between at least a first creative content and a second creative content. In such embodiments, the competition can include the first creative content depicted on the first or second graphical user interface with the second creative content, and an ability to swipe or tap on the first or second creative content to select a winner or a loser between the first and second creative content. The loser between the first and second creative content is removed from the first or second graphical user interface, and is replaced with a third creative content for selection relative to the winner between the first and second creative content. The first or second processing device is configured to create a ranking in real-time of the first, second and third creative content based on selection of the winner or the loser.

In accordance with embodiments of the present disclosure, an exemplary method of creative content interaction is provided. The method includes electronically adding creative content to creative content data of a creative content interface system with a first or second electronic device. The creative content interface system includes the first electronic device including a first graphical user interface, a first non-transitory computer readable medium, and a first processing device, the second electronic device including a second graphical user interface, a second non-transitory computer readable medium, and a second processing device, and a database in electronic communication with the first and second electronic devices, the database configured to electronically store user registration data and the creative content data. The method includes electronically interacting with the creative content added to the creative content data. The method includes transmitting electronic correspondence between the first and second electronic devices.

In accordance with embodiments of the present disclosure, an exemplary non-transitory computer-readable medium storing instructions that are executable by a processing device is provided. Execution of the instructions by the processing device causes the processing device to electronically add creative content to creative content data of a creative content interface system with a first or second electronic device. The creative content interface system includes the first electronic device including a first graphical user interface, a first non-transitory computer readable medium, and a first processing device, the second electronic device including a second graphical user interface, a second non-transitory computer readable medium, and a second processing device, and a database in electronic communication with the first and second electronic devices, the database configured to electronically store user registration data and the creative content data. Execution of the instructions by the processing device causes the processing device to electronically interact with the creative content added to the creative content data. Execution of the instructions by the processing device causes the processing device to transmit electronic correspondence between the first and second electronic devices.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed creative content interface system, reference is made to the accompanying figures, wherein.

DESCRIPTION OF EXEMPLARY EMBODIMENTS

In accordance with embodiments of the present disclosure, an exemplary creative content interface system is provided. The system can be used as an interface for performing transactions that allow a user (e.g., an artist, a collector, musician, photographer, videographer, or the like) to post and sell creative content, such as artwork, music, videos, or the like. The system can therefore be used as a means for marketing the creative content. In some embodiments, the system can be used as an interactive gaming interface that challenges the creative content relative to similar creative content by others, and creates an internal ranking system to determine the preferred creative content. The system provides advantageous features that allow the users to customize the interaction through the system, resulting in an improved interface for creative content transactions. In some embodiments, the system allows for artists to sell, play and interact with their audiences (e.g., in a marketing and gaming system) for various types of medium, such as art, music, or the like). The system provides customizable, configurable and/or reconfigurable settings that improve opportunities for selling and marketing of the creative content.

In some embodiments, the system can be accessed by the user at a computing device and/or a smart mobile device. In some embodiments, the system can prevent users from screen recording or capturing screenshots on their device (e.g., mobile device) while using the creative content interface system. In some embodiments, the system can prevent users from screen recording when using the creative content interface system on their mobile device for both artwork and music/videos. The system can provide different means or options for selling their creative content, e.g., raffle, auction, set price, price play, or the like. In some embodiments, the system can provide a maximum bid option to users/collectors/buyers to increase the chance of winning an auction style transaction related to creative content. In some embodiments, the system can provide the user/collector/buyer with an option to set a duration or time limit for their bid to promote action by the user/artist/seller selling the creative content. In some embodiments, the system can provide an interface for ranking the creative content based on categories, challenges, genres, themes, or the like. In some embodiments, the system can include specific color designations (e.g., differently colored rings) around profile images to identify specific users in the interface/application setting.

Figure 1:
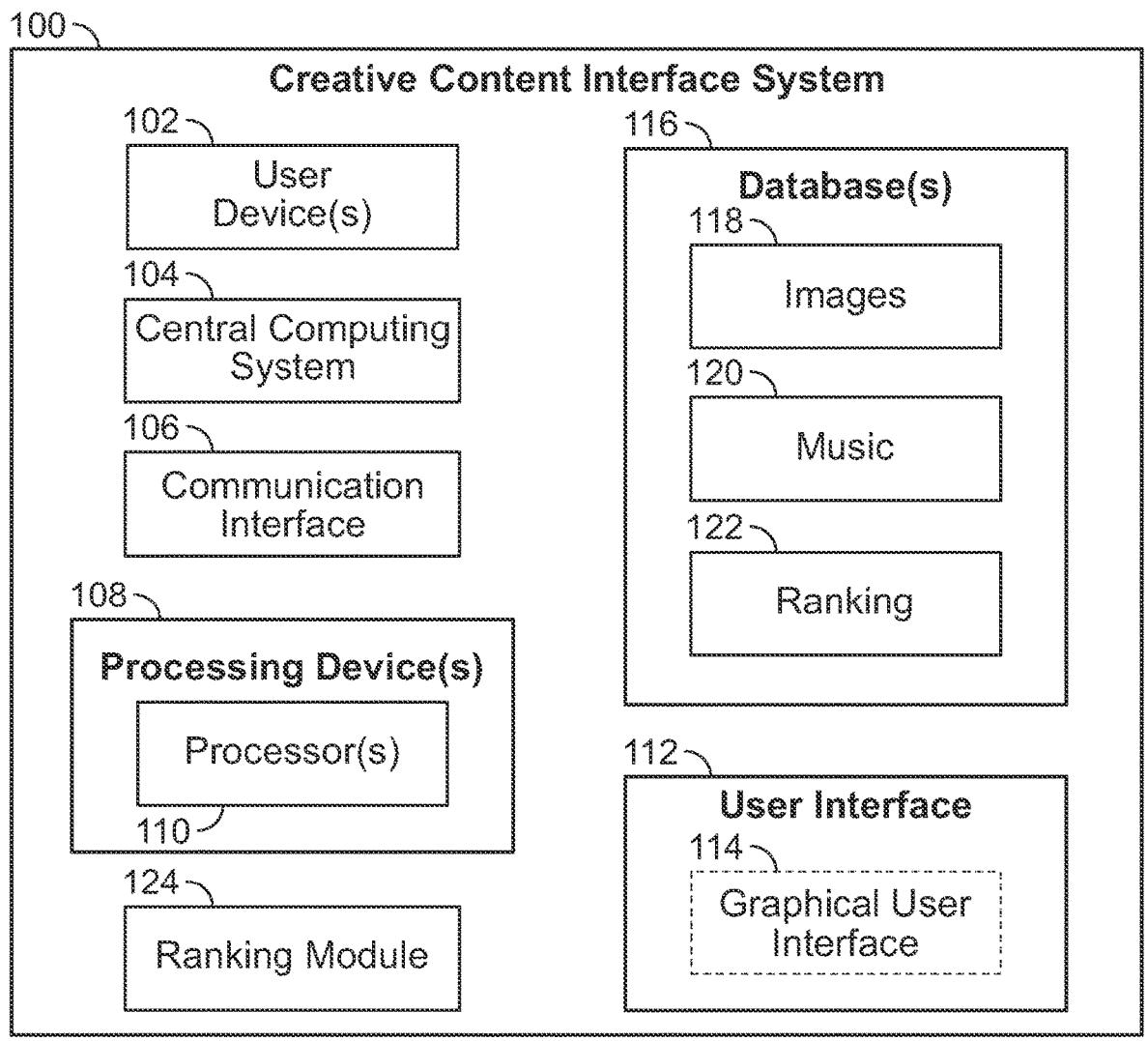
FIG. 1 is a block diagram of an exemplary creative content interface system according to the present disclosure.

FIG. 1 is a perspective view of a creative content interface system 100 (hereinafter referred to as "system 100") of the present disclosure. The system 100 can be a marketing and/or gaming system. The system 100 includes two or more user devices 102 (e.g., computing devices, mobile devices, or the like) in communication with a central computing system 104 via a communication interface 106 (e.g., a network). The system 100 can include one or more processing devices 108 with one or more processors 110 for processing data input into the system 100 via the user devices 102. In some embodiments, the processing device 108 can be incorporated into each of the user devices 102.

The system 100 includes user interfaces 112 with a graphical user interface (GUI) 114 for interaction with the system 100. In some embodiments, the interface 112 can be an interface 130 for a user, artist, or seller (see, e.g., FIG. 2). In some embodiments, the interface 130 can be used by the original artist who created the creative content. In some embodiments, the interface 130 can be used by any seller intending to market or promote creative content in their possession. In some embodiments, the interface 112 can be an interface 160 for a user, collector, or buyer (see, e.g., FIG. 3).

Still with reference to FIG. 1, the GUI 114 can be on the user devices 102. The system 100 includes one or more databases 116 capable of electronically storing data input and/or generated/output by the system 100. In some embodiments, the data stored in the databases 116 can be related to creative content, e.g., images 118, music 120. In some embodiments, the creative content can include videos or a combination of videos, images and music. The databases 116 can electronically store data related to a ranking 122 generated by the system 100 for the creative content as part of the challenge interface available in the system 100. The system 100 can include a ranking module 124 configured to receive as input the creative content and generate a ranking of the creative content based on selective interaction of users with the system 100. The system 100 allows users to upload the creative content and designate specific characteristics associated with selling/marketing of the medium provided in the uploaded data. The system 100 provides a technical improvement to traditional electronic marketplace systems by providing both the buyer and seller with several customizable options for selling their medium, improving the opportunity for the user to sell their medium for a competitive price and for the buyer to purchase the medium within a desired price range.

Figure 2:
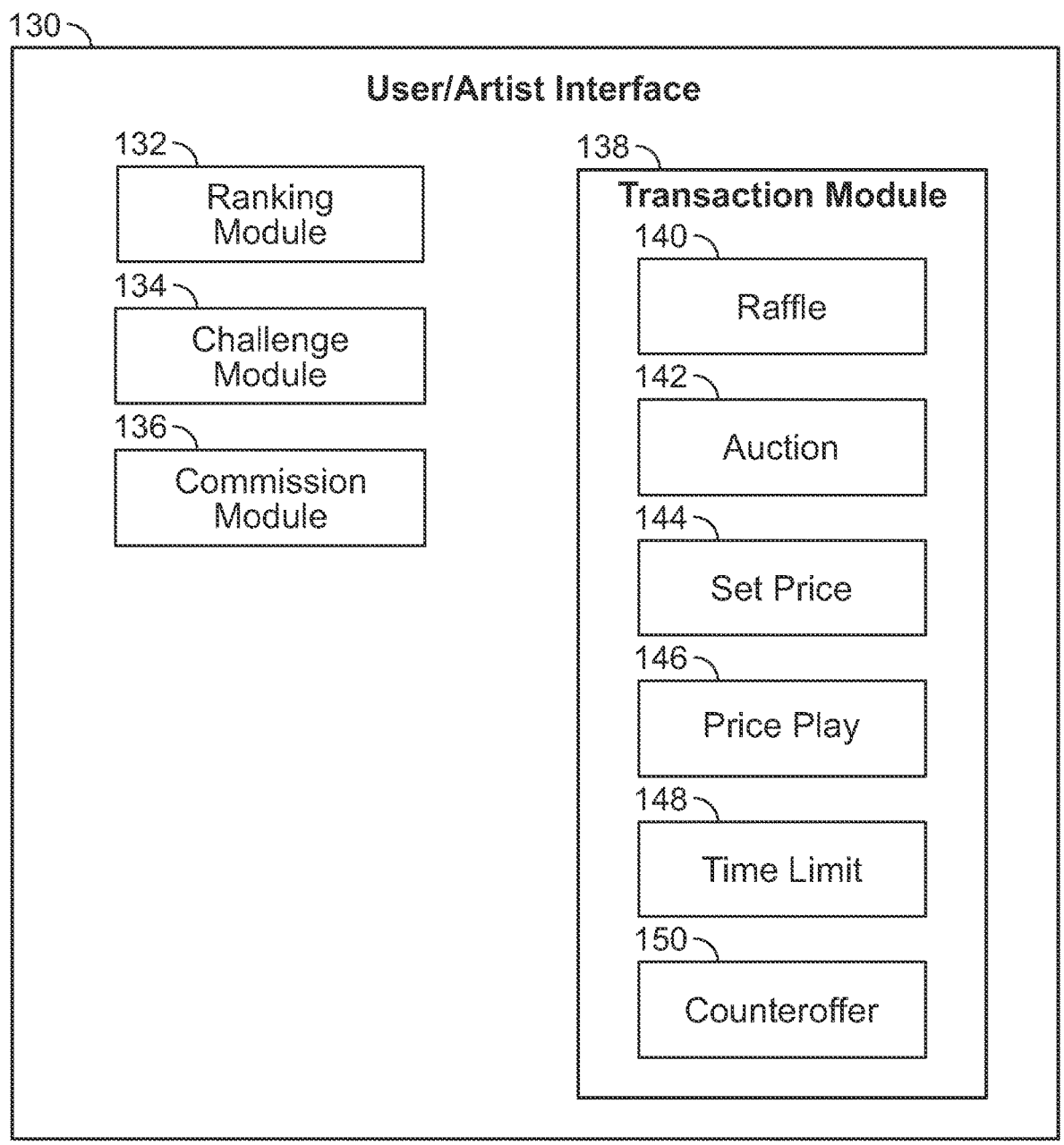
FIG. 2 is a block diagram of a user/artist interface of an exemplary creative content interface system of FIG. 1.
Figure 3:
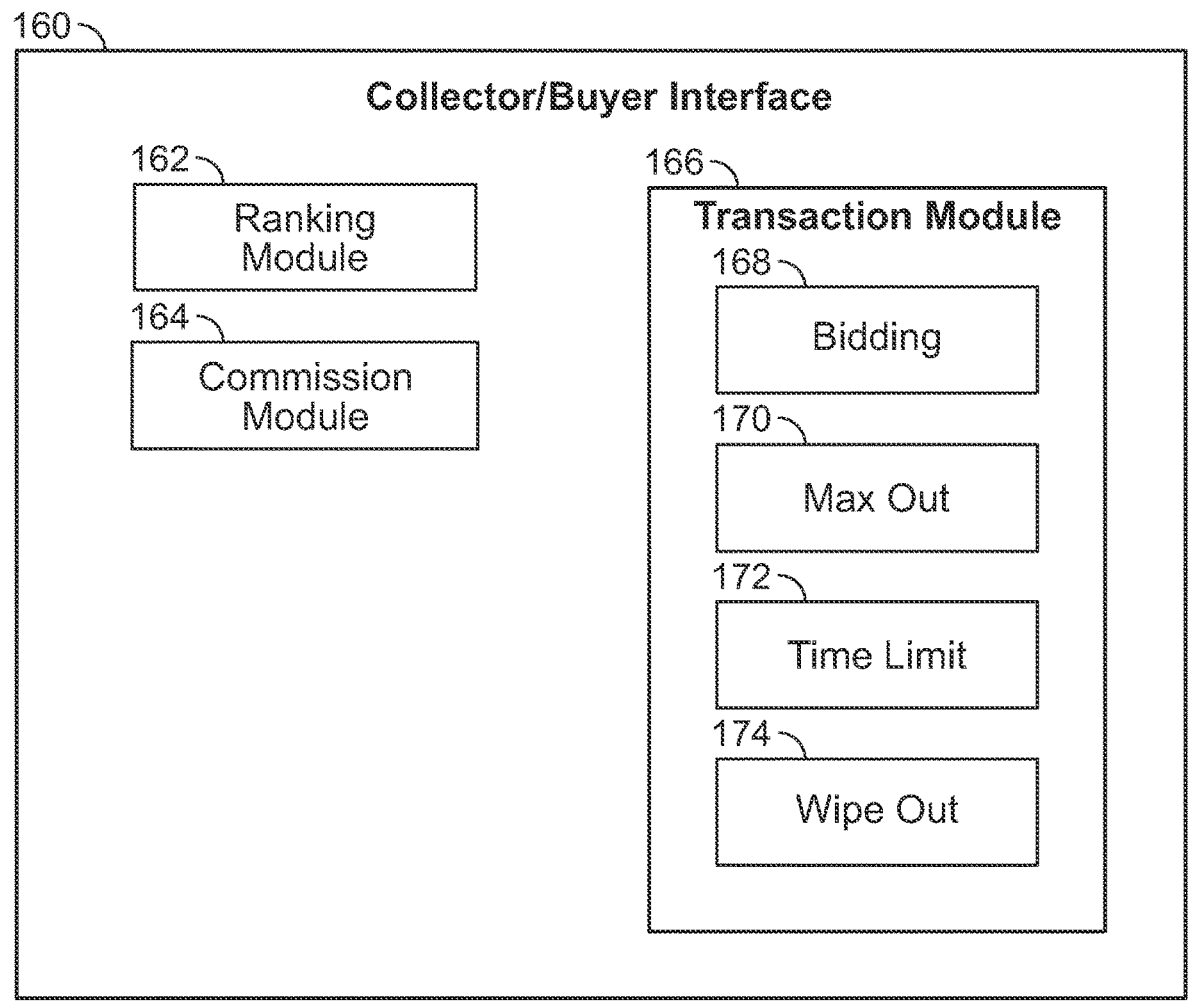
FIG. 3 is a block diagram of a collector/buyer interface of an exemplary creative content interface system of FIG. 1.

FIG. 2 is a block diagram of a user/artist interface 130 that can be used to upload creative content to the system 100 and for interaction with other users/buyers through the interface 160 of FIG. 3. The interface 130 includes a transaction module 138 that can be executed by the processing device 108 facilitates for transactions associated with the creative content of the user. In some embodiments, the transaction module 138 can allow for various styles of transactions, e.g., raffle 140, auction 142, set price 144, price play 146, or the like. In some embodiments, the transaction module 138 can be used for establishing a time limit 148 for a transaction and/or offer associated with a transaction. In some embodiments, the transaction module 138 can be used to create counteroffers 150 associated with a transaction.

The interface 130 can include a ranking module 132 capable of being executed by the processing device 108 to operate in cooperation with the ranking module 124 to generate a ranking 122 associated with creative content. The interface 130 can include a challenge module 134 capable of being executed by the processing device 108 to create and/or edit a challenge associated with creative content. The interface 130 can include a commission module 136 capable of being executed by the processing device 108 to establish a commission option for use through the system 100. Each of the operations associated with the interface 130 is discussed in greater detail below.

FIG. 3 is a block diagram of a collector/buyer interface 160 capable of being used for acquiring creative content from another user/seller. The interface 160 includes a transaction module 166 capable of being executed by the processing device 108 to purchase or bid on creative content posted to the system 100. The transaction module 166 can include a bidding 168 option for placing an electronic bid on creative content participating in an auction style transaction. The transaction module 166 can include a max out 170 option for expediting a bid on creative content participating in an auction style transaction. The transaction module 166 can include a time limit 172 option for establishing a countdown for acceptance of a bid placed on creative content during an auction style transaction. The transaction module 166 can include a wipe out 174 option for a bid or offer placed on creative content during a transaction. Each of the operations associated with the interface 160 is discussed in greater detail below.

Figure 4:
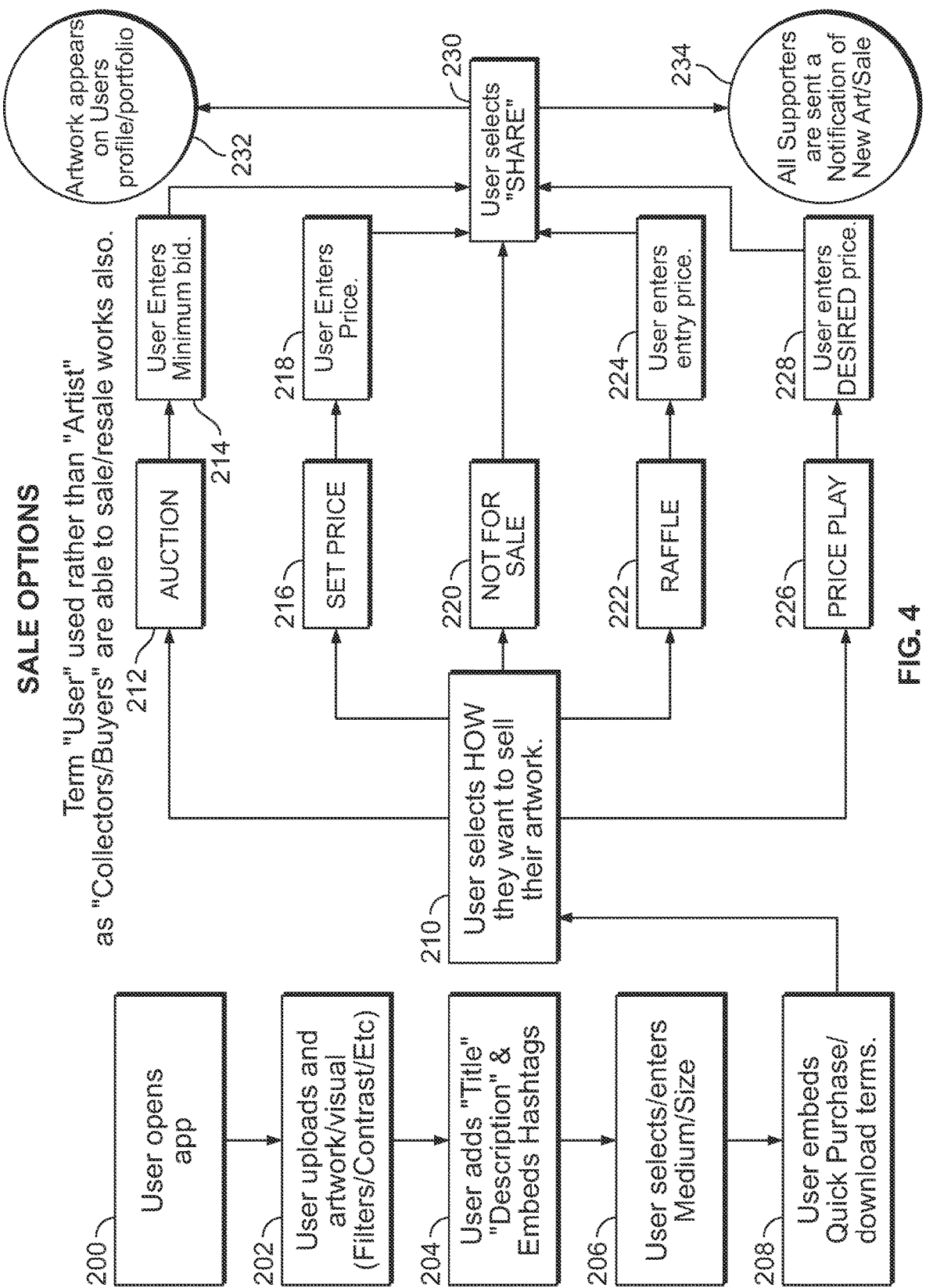
FIG. 4 is a flowchart illustrating selection of transaction options within an exemplary creative content interface system of the present disclosure.

FIG. 4 is a flowchart illustrating selection of transaction options within the system 100. In particular, the flowchart of FIG. 4 illustrates the different transaction options a user can select when selling their creative content on the system 100 using the interface 130. The system 100 provides multiple different ways to interact with potential buyers of the creative content through a single platform or interface. At step 200, the user opens the application on a user device to access the graphical user interface of the system 100. At step 202, the user can upload creative content (e.g., artwork, video, or the like) and can add one or more filters and/or contrast to edit the creative content uploaded to the system 100. At step 204, the user can add a title, description and/or embed hashtags associated with the creative content using the interface. At step 206, the user can select/enter/input a dimensional size and medium of the creative content. At step 208, the user can embed or input quick purchase and/or download terms for the creative content. The user can therefore use the interface to designate a number of characteristics associated with the creative content added to the system 100.

At step 210, the user can select how the creative content is to be sold through the system 100. The options for selling the creative content include auction (step 212), set price (step 216), not for sale (step 220), raffle (step 222), or price play (step 226). If an auction style sale is selected, the user can enter the minimum bid amount at step 214. If a set price style sale is selected, the user can enter the desired sale price at step 218. If a raffle style sale is selected, the user can enter any desired entry price for the raffle at step 224. If a price play style sale is selected, the user can enter the desired price at step 228. For each of the sale options, at step 230, the user can select the creative content to be shared publicly or with selected individuals. At step 232, the creative content can appear on the user's profile or portfolio in the interface. At step 234, all supporters or users of the system 100 can be sent a notification of the new creative content added to the system 100 for sale.

The user can use the system 100 to capture a new photograph or select a photograph from the electronic photograph library on their device. The user (e.g., creator, artist, or the like) can upload an electronic image of their creative content to the system 100. The user can create the title for their creative content, add a description, a medium, and/or hashtags associated with the creative content. The user can use the interface to select how they prefer to sell the creative content: auction, raffle, price play, or set price. In some embodiments, if an auction or raffle transaction is selected, the user can enter the time frame associated with the transaction. Different options for selling the creative content are provided to the user in a single interface/system 100, allowing for a customized manner of selling that maximizes the visibility of the creative content as well as the potential profit for the user. The system 100 can thereby be used to meet the needs of multiple types of users (sellers and buyers). The user can set their own price, entry amount, or starting price, and any provisions and/or royalties. The creative content is shared and set to the audience of the user (e.g., all public users, all subscribers on the system 100, or the like). In some embodiments, the audience includes users of the system 100 who have opted into participating in future transactions.

The figures discussed herein include illustrative examples of user interfaces of the system 100 for uploading and/or interacting with creative content. It should be understood that one or more features of the different interfaces can be interchanged to allow for varied and customized functionality of the interfaces.

Figure 5A:
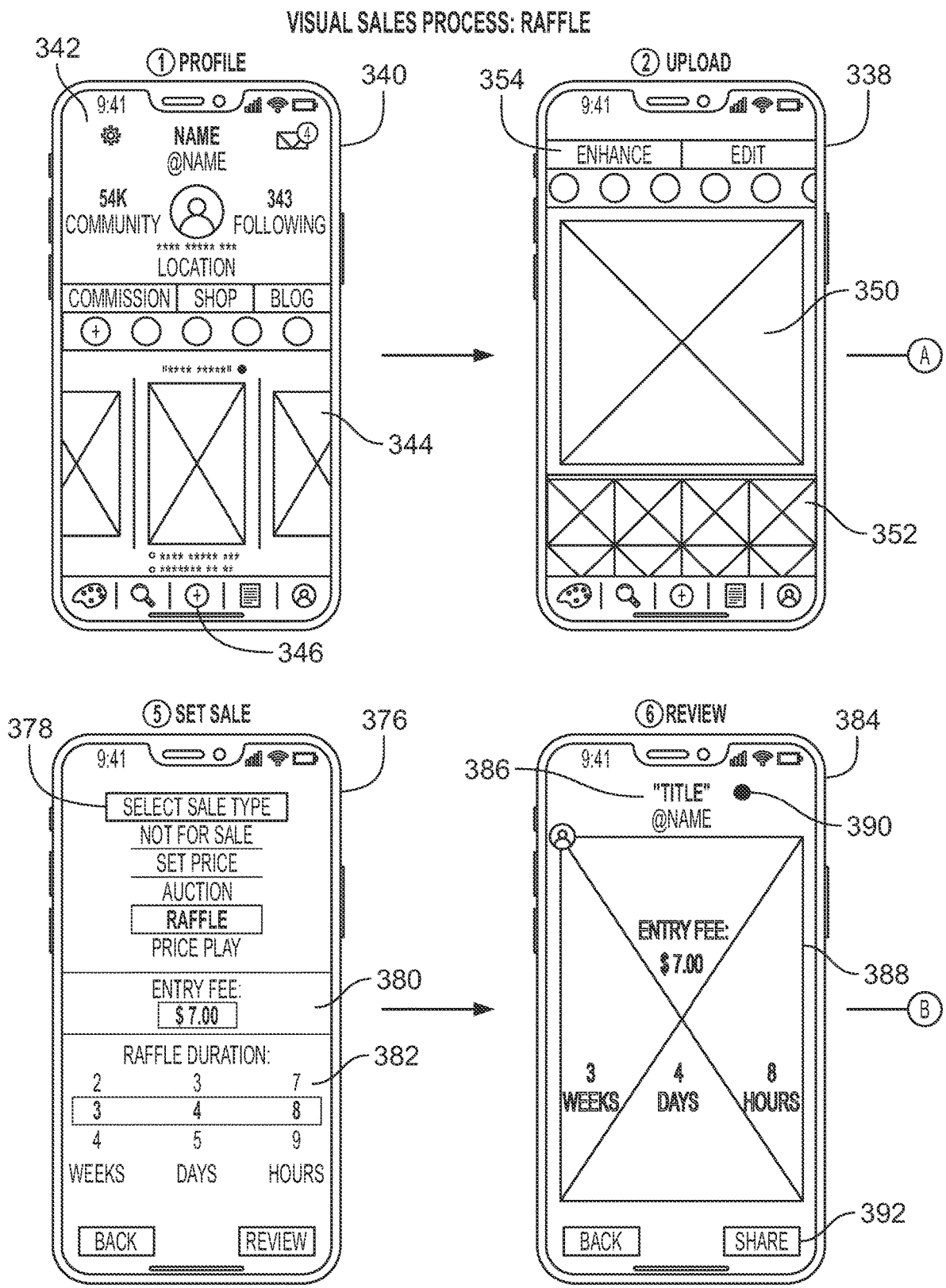
FIGS. 5A-5C are flowcharts illustrating a user interface with a raffle style transaction within an exemplary creative content interface system of the present disclosure.
Figure 5A:
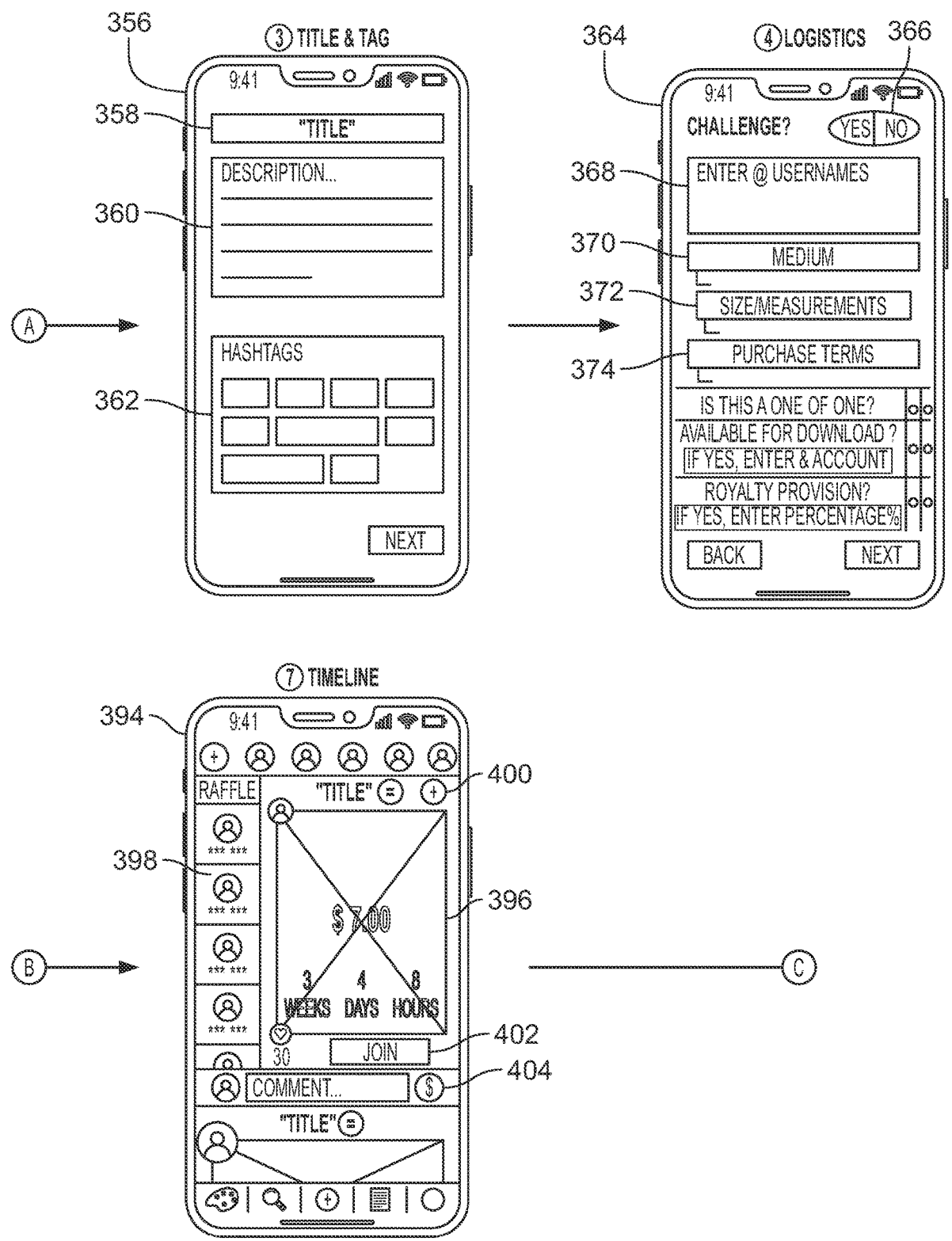
Figure 5A:
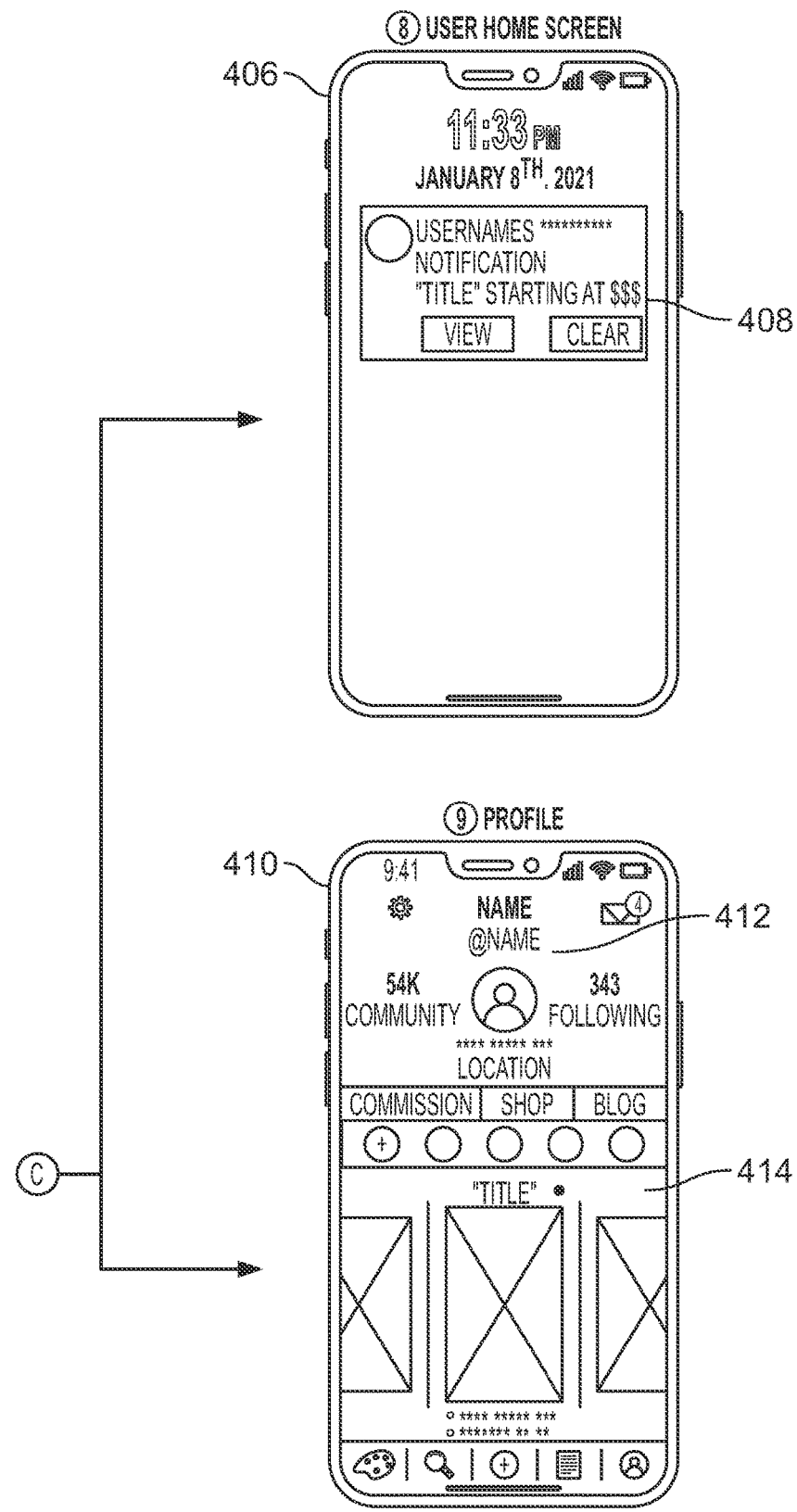
Figure 5B:
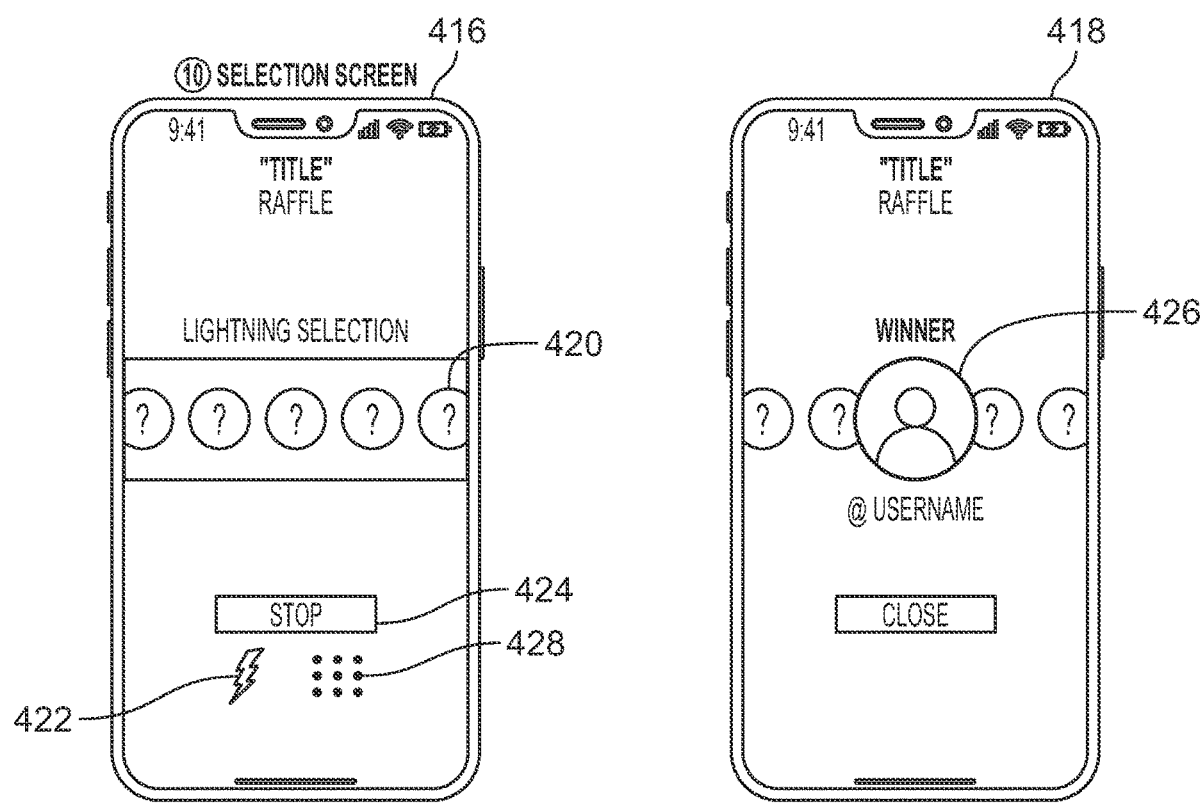
Figure 5C:
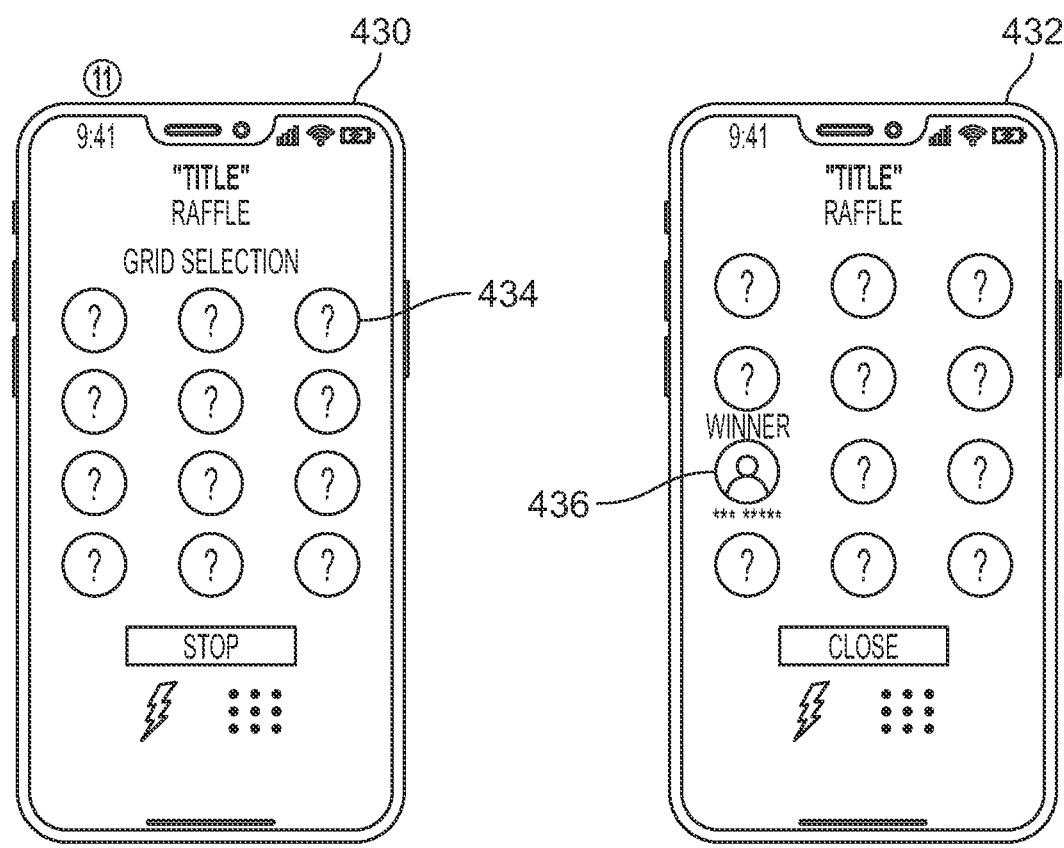

FIGS. 5A-5C are flowcharts illustrating a user interface with a raffle style transaction within the system 100. With respect to FIG. 5A, at step 340, the interface can include a profile section 342 that provides the information associated with the user, e.g., name, community, followers, location, or the like. The profile section 342 can include selections for commissions, the user shop, and the user blog creative content of the user. Content section 344 (e.g., electronic gallery) can include one or more images of creative content associated with the user and/or associated with other users of the system 100. For example, the content section 344 can include a live or real-time feed of new content uploaded to the system 100 by other users. The interface can include an upload section 346 for uploading images and/or videos associated with creative content of the user. The user can therefore use the upload section 346 to select an image of their creative content saved to the user device (or capture an electronic image of the creative content) for upload to the system 100. In some embodiments, the user can select creative content from the section 344 for additional action in the system 100 (e.g., to initiate a sale of a previously non-sale upload to the system 100).

At interface 348, upon actuation of an "add" button in the upload section 346, the user can select an image 350 from an electronic gallery 352 of images. An editing section 354 can be used to enhance and/or edit the selected electronic image 350. At interface 356, the user can input the title 358, description 360, and (optionally) hashtags 362 associated with the selected creative content. In some embodiments, the system 100 can provide suggestions for the hashtags 362 based on the title and/or description input to the system 100.

At interface 364, the user can select whether the creative content should be entered into a challenge 366 (e.g., a ranked competition relative to similar creative content of other users, or potentially content of the same user). Input section 368 can be used to add usernames of individuals who the user is inviting to participate in the challenge competition. For example, the user can select one or more specific usernames to challenge relative to the selected creative content of the user. The interface 364 can be used to input additional details regarding the selected creative content. For example, the interface 364 can be used to input the medium 370 and size/measurements 372 of the creative content. The purchase terms 374 can include information such as, e.g., the number of creative content available for sale, whether the content is available for download, royalty provisions, combinations thereof, or the like. In some embodiments, one or more of the selections in the interface 364 can include drop down menus that expand and collapse to display options, multiple choice circles, or the like. The options can be displayed as multiple choice (e.g., circles or on a picker display). In some embodiments, the responses can be typed in by the user.

At interface 376, at sale type selection 378, the user can select the type of sale/transaction for the creative content (e.g., set price, auction, raffle, price play) via a drop down menu. In this instance, the raffle sale type is selected. At entry fee section 380, the user can input the dollar amount for other users to enter the raffle for the creative content. In some embodiments, selection section 380 can open a calculator pad to allow for electronic input of the fee amount by the user. At duration section 382, the user can input a customized time period duration for the raffle. Thus, rather than a predetermined or preset duration determined by the system 100, the user can select their own duration, which can vary as desired by the user.

Upon selection of the "review" button, at interface 384, the user can review the creative content raffle before sharing it with other users. The review interface 384 can include a details section 386 with the title and username. A preview section 388 can display the creative content, the raffle entry fee, and the duration countdown for the raffle. An edit button 390 can be selected to return to the interface 376 for updates to the raffle. If the preview is satisfactory to the user, the share button 392 can be selected to share the creative content raffle with other users.

In some embodiments, sharing the creative content raffle can transmit the raffle information to an electronic timeline of the system 100, as represented by interface 394. The interface 394 can include a raffle details section 396 with the creative content, the raffle entry cost, and the duration countdown. A users section 398 can indicate the users who have joined the raffle. A selector 400 can be used to save, send to collectives, or track the raffle. A join button 402 can be used to join the raffle. A selector 404 can be used to purchase/download the content based on the creator's set fee, price changes to bigger rate if a non-fungible token (NFT) is purchased, or the like. The user can scroll vertically within the interface 394 to view multiple raffles to decide which raffle to participate in. The user selling the creative content is therefore able to scroll through bids; can accept offers by tapping "accept"; can decline offers by swiping off the screen; can have the option of sending, saving, or tracking the creative content; can join the raffle by tapping the join button; and can purchase and/or download based on the creator's set fee, with price changes reflected if cryptocurrency is to be used. Interface 406 shows a notification 408 to users on their mobile device regarding the raffle shared with users (e.g., visible by a user following the seller). The interface 410 provides a profile view of the raffle, including a details section 412 with the name, community, followers, and location of the user, and the creative content listing 414 with creative content of the user (and/or other users).

FIG. 5A therefore illustrates the steps for initiating a raffle style transaction using the system 100. With the creative content and details of the raffle uploaded to the system 100, the raffle is initiated and users can participate by paying the raffle fee. With respect to FIG. 5B, interfaces 416, 418 illustrate selection of the raffle winner by the user who uploaded the creative content. FIG. 5B illustrates a lighting selection option of the system 100. A participants section 420 can include a representation of each participant in the raffle. Clicking the selection button 422 can initiate the lightning selection of a raffle winner by moving the participants in the section 420 at an unidentifiable rate such that the user cannot visualize or identify the participants, thereby ensuring an unbiased winner selection. Clicking the stop button 424 automatically selects a winner 426, who is presented with an enlarged depicted in interface 418, along with the username of the winner. Upon selection, the winner is automatically notified by the system 100. The losers of the raffle can also be electronically notified. Grid selection 428 can be chosen on the interface 416 if the user would prefer to avoid the lightning selection option.

FIG. 5C shows interfaces 430, 432 for a grid selection option of a winner for the raffle. In the interface 430, all participants 434 can be represented by blurred circles, ensuring an anonymous selection of the raffle winner. The user can randomly choose one of the blurred circles of the participants 434 to select the winner 436, and upon selection, the winner's profile or image and username can be revealed (unblurred). For example, if the user selects the blurred circle of participant 434 which is in the leftmost column, second from the bottom, the selected circle is revealed as the winner 436. The other participants can remain blurred. The winner (and losers) of the raffle can be electronically notified by the system 100. The user can then coordinate with the winner for sending the creative content to the winner. Thus, in each instance, the winner of the raffle is selected randomly.

Figure 6:
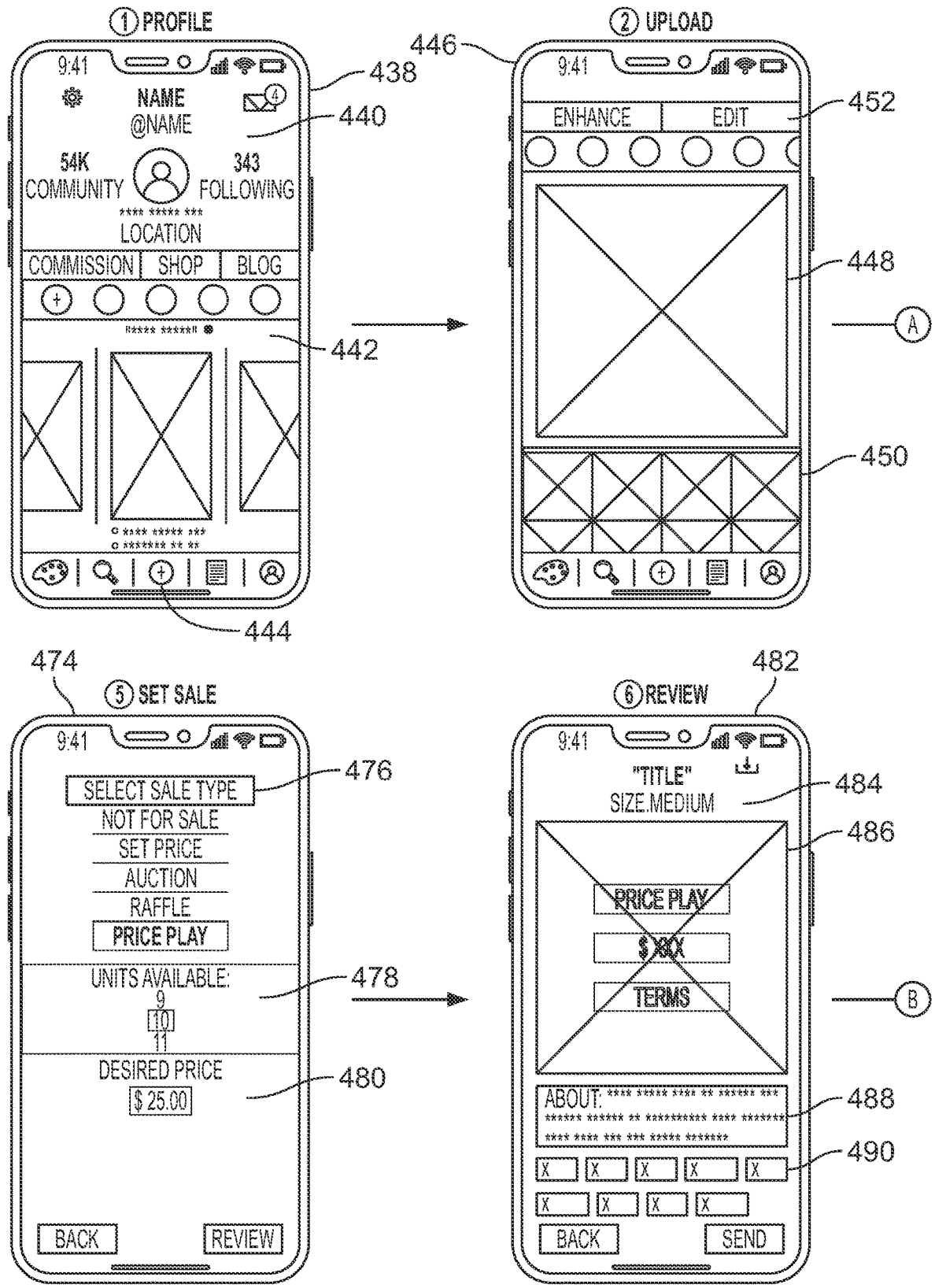
FIG. 6 is a flowchart illustrating a user interface with a price play style transaction within an exemplary creative content interface system of the present disclosure.
Figure 6:
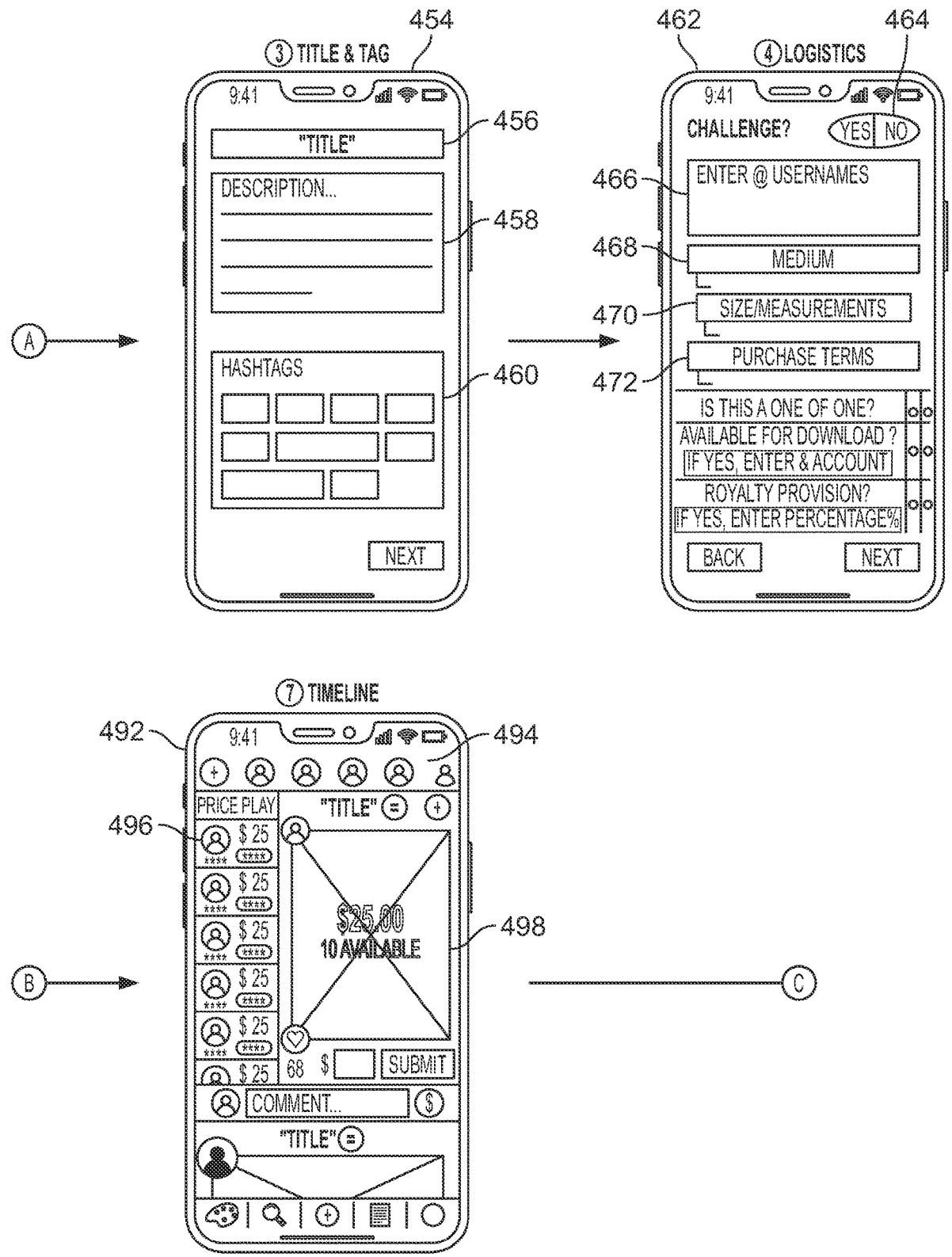
Figure 6:
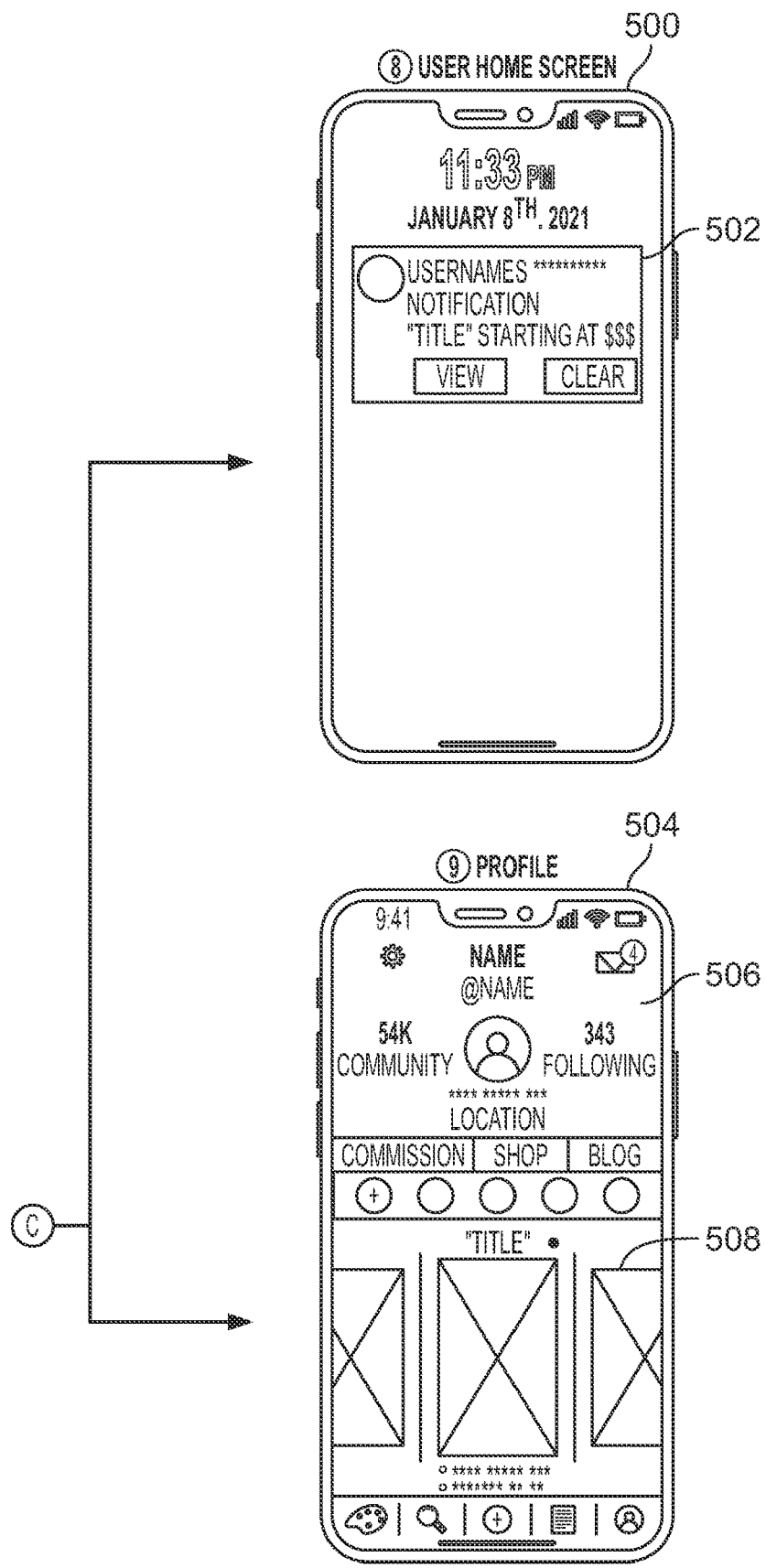

FIG. 6 is a flowchart illustrating a user interface with a price play style transaction within the system 100. Interface 438 provides a profile view of the user with the section 440 having the user's information, the section 442 having a feed of creative content from the user and/or other users, and a section 444 for adding new creative content to the system 100. For the price play style transaction, the system 100 can be used to select an existing creative content already uploaded to the user's gallery/portfolio, or the user can add a new creative content to the system 100. For example, interface 446 can select an electronic image 448 of the creative content from a gallery 450, and a section 452 can be used to edit and/or enhance the image 448. The interface 454 can be used to add the title 456, the description 458, and (optionally) hashtags 460 associated with the creative content. The interface 462 can be used to select whether the creative content will participate in a challenge 464 and section 466 can be used to invite users to participate in the challenge. Additional details regarding the creative content can be input to the system 100, such as the medium 468, the size/measurements 470, and purchase terms 472.

In interface 474, the user can select the type of sale in section 476, e.g., price play. Section 478 can be used to input the number of creative content available, and section 480 can be used to input the desired price of the creative content. The review interface 482 allows the user to review the creative content before starting the price play style transaction. The interface 482 can include a section 484 with details about the creative content, such as the title, size, medium, and purchase terms, and a section 486 with the creative content preview. Section 488 can include additional information about the creative content and/or the artist, and section 490 can include hashtags and/or users to be invited. Taping the title can allow the user to edit the information before sharing the creative content with users.

The interface 492 shows sharing of the creative content to a timeline of the system 100. The section 494 can indicate users who are invited to the price play style transaction, and section 496 can include a list of offers or bids on the creative content. Section 498 provides details on the price play creative content. The user can scroll through the offers in section 496, accepting offers by tapping an "accept" button, or declining offers by swiping them of the screen. Users can send, save or track the creative content. The interface 500 shows a user's home screen on a mobile device with a notification 502 regarding the price play transaction information. The interface 504 illustrates a profile view of a user, with a section 406 indicating details of the user and a section 508 providing a real-time feed of price play options. The user can click on a "price entry" button to enter an amount to participate in the price play transaction. Users can purchase and/or download the creative content based on the creator's set fee, and price changes to the buy rate can be provided if cryptocurrency is used to purchase the creative content.

Figure 7:
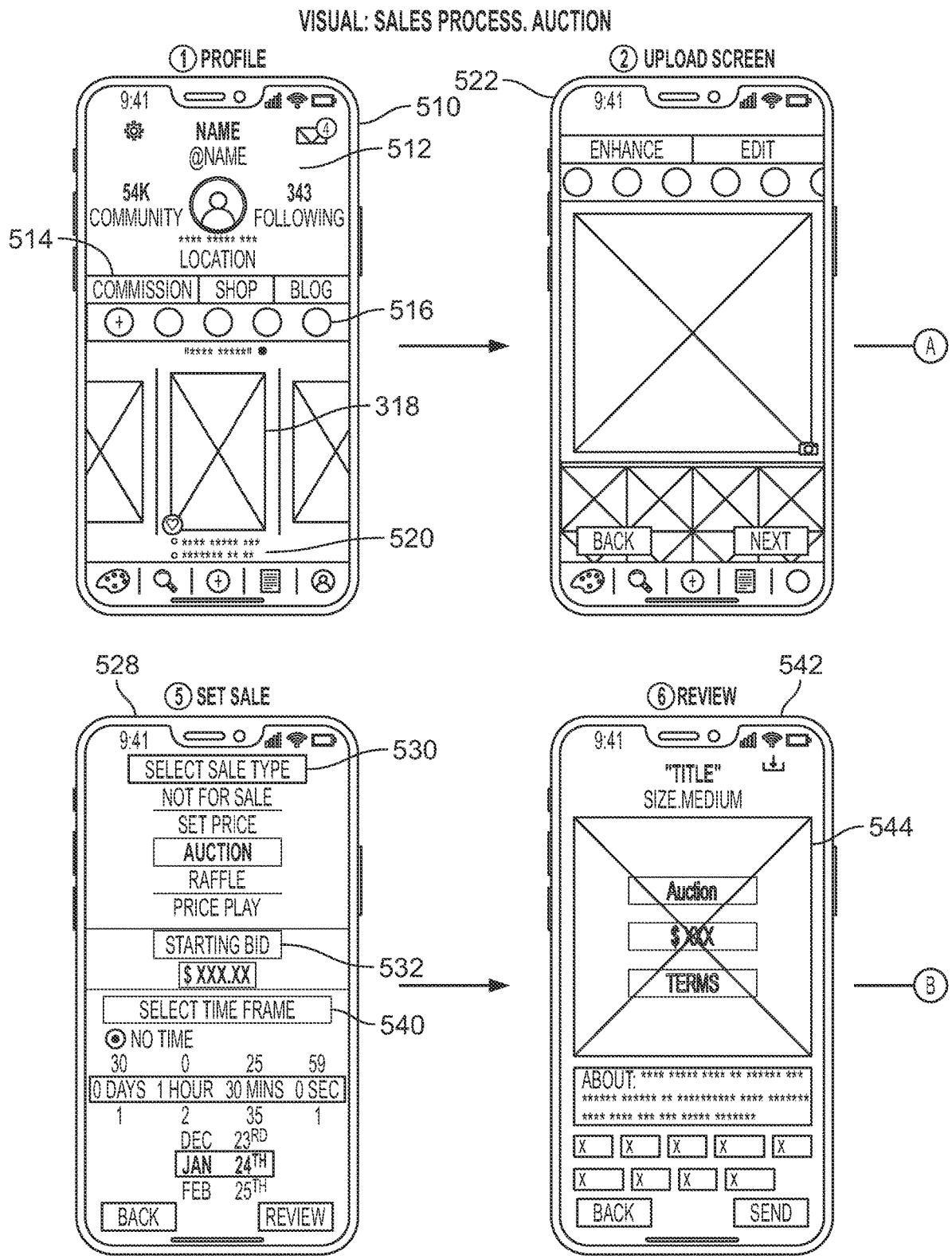
FIG. 7 is a flowchart illustrating a user interface with an auction style transaction within an exemplary creative content interface system of the present disclosure.
Figure 7:
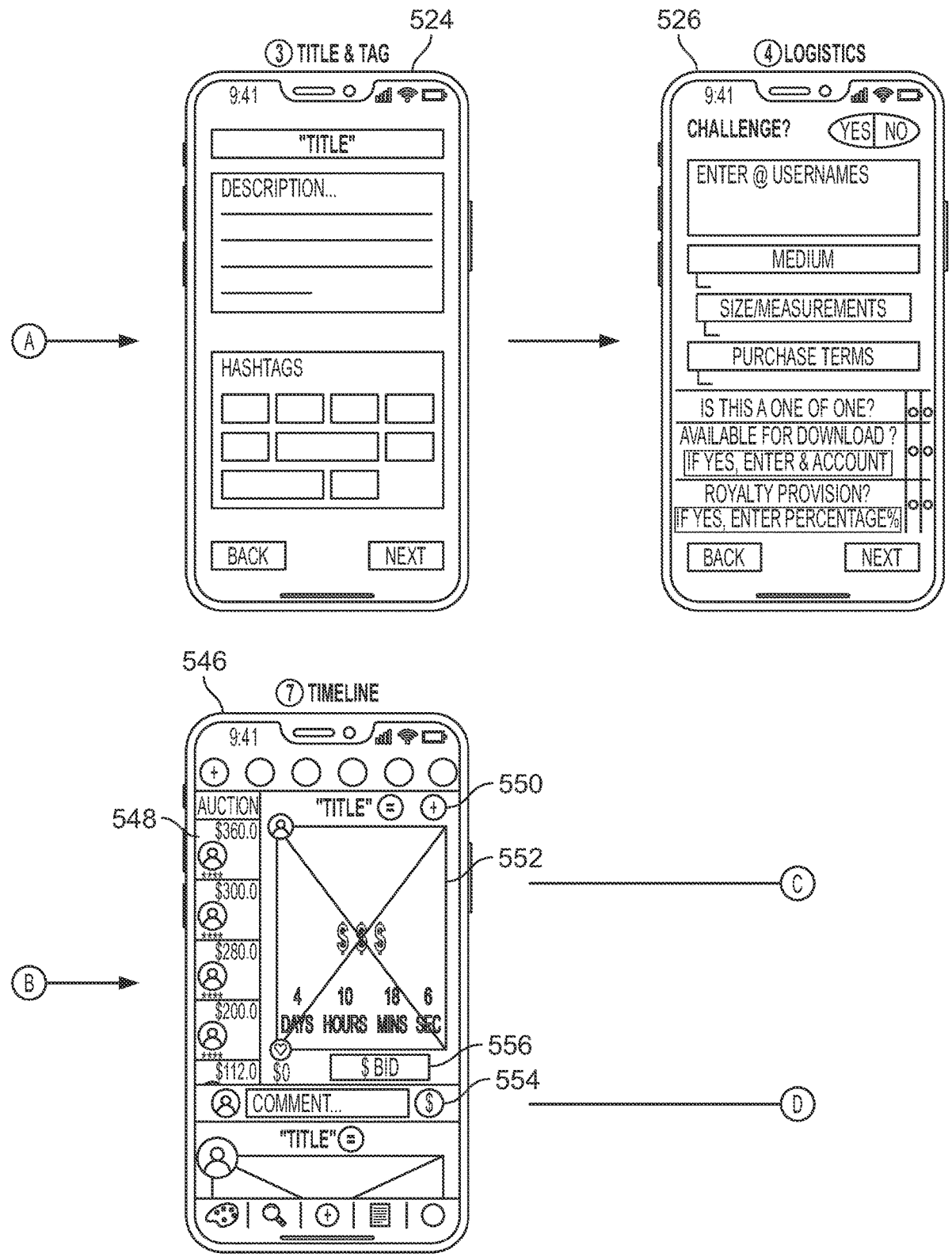
Figure 7:
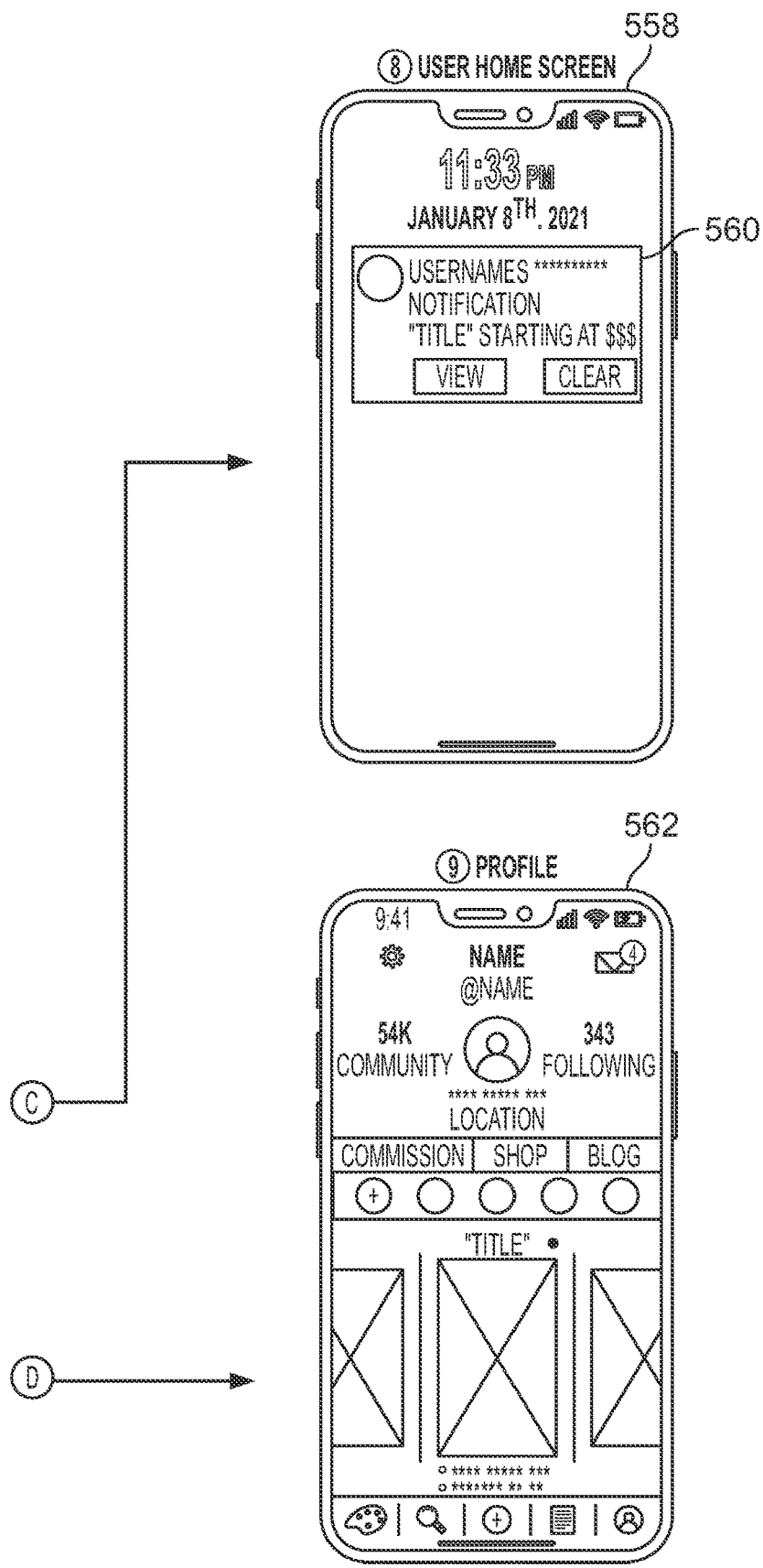

FIG. 7 is a flowchart illustrating a user interface with an auction style transaction within the system 100. The interface 510 includes a section 512 with profile information regarding the user, and a section 514 with an option for setting commission settings, viewing of the user's shop, and the user's blog. The circle around the user's image in the section 512 can be color coordinated to designate the user as an artist or a buyer/collector. Section 516 can include circular visual indicators that provide notifications to the user regarding updates on posts to the system 100. Section 518 can include visual representations of various creative content from other users, and allows from scrolling through the creative content until a desired creative content is found. Section 520 can include comments and/or activity associated with the creative content.

Interface 522 can be used to add, edit and/or enhance an electronic image of creative content, as discussed previously. Interface 524 can be used to add a title, description and hashtags associated with the creative content, as described previously. Interface 526 can be used to add the challenge, username, medium, size/measurements, and purchase terms details associated with the creative content, as described previously. Interface 528 includes a section 530 for selecting the type of transaction to be used, e.g., auction. The section 532 can be used to indicate the starting minimum bid for the transaction. The section 540 can be used to input a customized time frame for the auction. The time frame can be limited to a time period less than 24 hours, or can be selected based on a specific day and/or time. The system 100 therefore allows for the time frame to be customized and selected by each user independently from other users, providing more control to the individual selling the creative content.

The interface 542 provides a previous of the creative content auction, with a section 544 illustrating the creative content with the transaction type (auction), the minimum starting bid, and the terms. The interface 546 includes a section 548 with real-time bid information, including the username and bid from each individual. The bids can be organized with the highest bid at the time. In some embodiments, the auction style transaction can continue until the time period has been completed, with the highest bid winning the bid for the creative content. In some embodiments, the seller can tap accept on a bid to stop the auction before the time period has been completed. The user can swipe offers off the screen to decline the offer. Section 550 (or button selection) can be used to send, save, or track the auction of the creative content. Section 552 depicts details of the creative content auction, with the highest bid overlaid on the creative content and updated in real-time based on bids from users. The time period remaining in the auction is also provided. Bidding on the auction can be performed using section 556, and section 554 can be used to purchase or download the creative content based on the creator's set fee. The interface 558 shows a notification 560 on a user's mobile device when the auction begins, and the interface 562 shows a profile view on a mobile device with multiple creative content auctions available for viewing.

Figure 8:
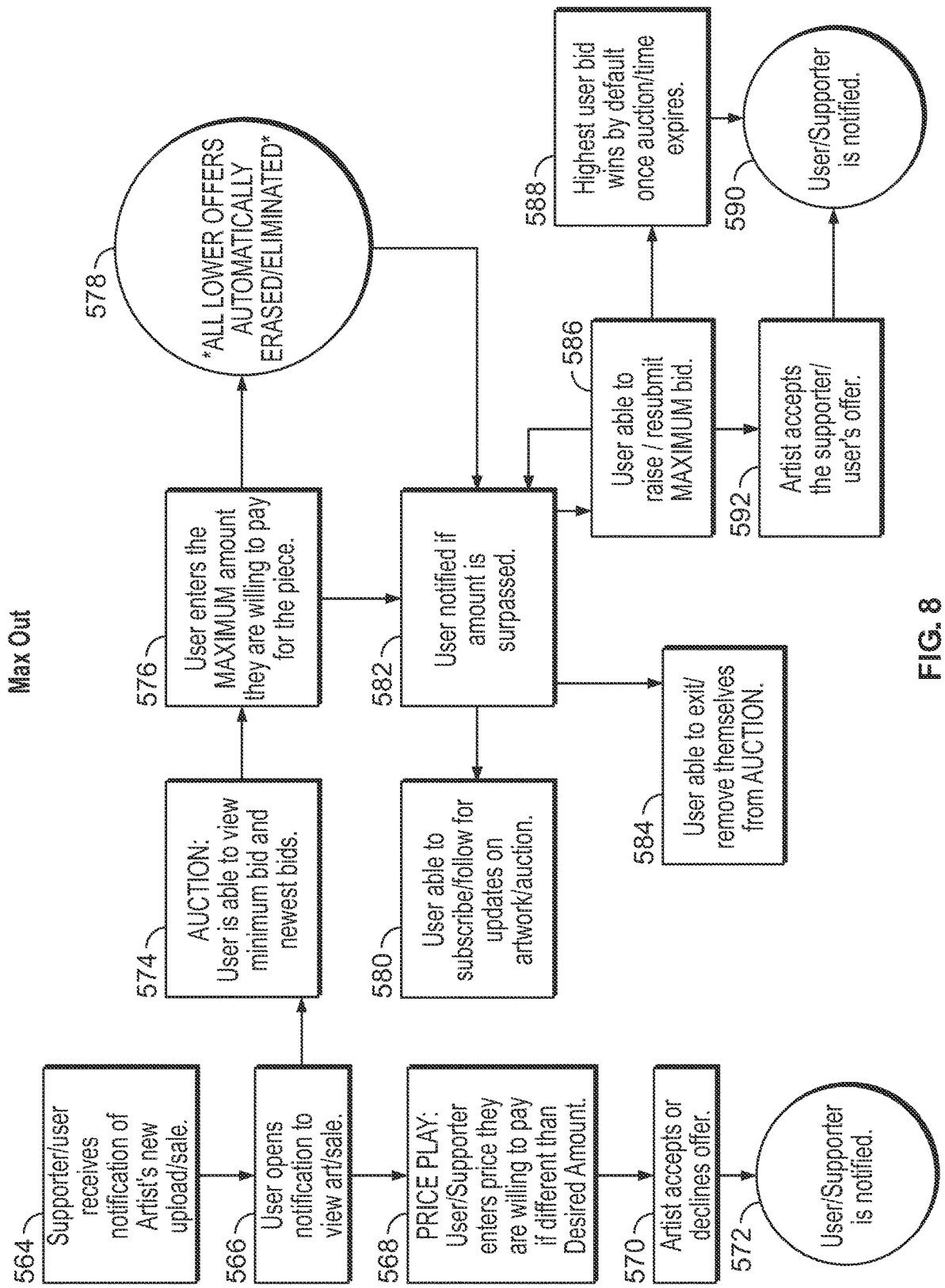
FIG. 8 is a flowchart illustrating selection of a max out option within an exemplary creative content interface system of the present disclosure.

FIG. 8 is a flowchart illustrating selection of a max out option within the system 100. The max out option allows users to enter a maximum bid to boost the price of the creative content and increase their chance of winning the auction. In some embodiments, for others to counter the maximum bid, the subsequent bid should be the previous maximum bid plus 10%. In particular, traditional bidding systems typically allow a user to enter a maximum bid and the system incrementally increases the bid by a predetermined increment based on bids or maximum bids entered by other users. For example, if the current bid by users is $100 and a user enters a maximum bid of $300, the traditional system can incrementally increase the bid by, e.g., $5, until the user's bid is the highest current bid. In such instances, although the user's maximum bid was $300, the highest current bid may be below this amount if others have not bid higher than, for example, $150. The highest current bid would therefore be $155. In contrast, the max out option of the system 100 allows the user to bypass the incremental bidding and automatically bid the maximum amount from the user. In the example above, although the current bid is $100 and the highest bid from other users is $150, the max out option would automatically bid the maximum amount of $300 of the user, bypassing the incremental bidding.

With reference to FIG. 8, at step 564, the user receives a notification of an upload/sale of creative content. At step 566, the user opens the notification to view the creative content and auction. At step 568, if the creative content is being marketed using a price play transaction, the user enters the price they are willing to pay (if different than the desired amount). At step 570, the artist either accepts or declines the offer, and at step 572 the user/supporter is notified via an electronic notification. At step 574, if the transaction is an auction style transaction, the user is able to view the minimum bid and the newest bids for the creative content. At step 576, the user can enter the maximum amount they are willing to pay for the creative content. At step 578, the system automatically erases or eliminates all lower offers, and at step 582, the user is notified if the amount is surpassed. At step 580, the user is able to subscribe or follow the creative content/user for updates regarding the auction.

If the bid has been surpassed, at step 584, the user can remove themselves from the auction. Alternatively, at step 586, the user is able to raise or resubmit another maximum bid for the creative content. At step 592, the artist can accept the offer and the user is notified at step 590. Alternatively, the auction can continue until the highest user bid wins by default when the auction is completed at step 588.

Figure 9:
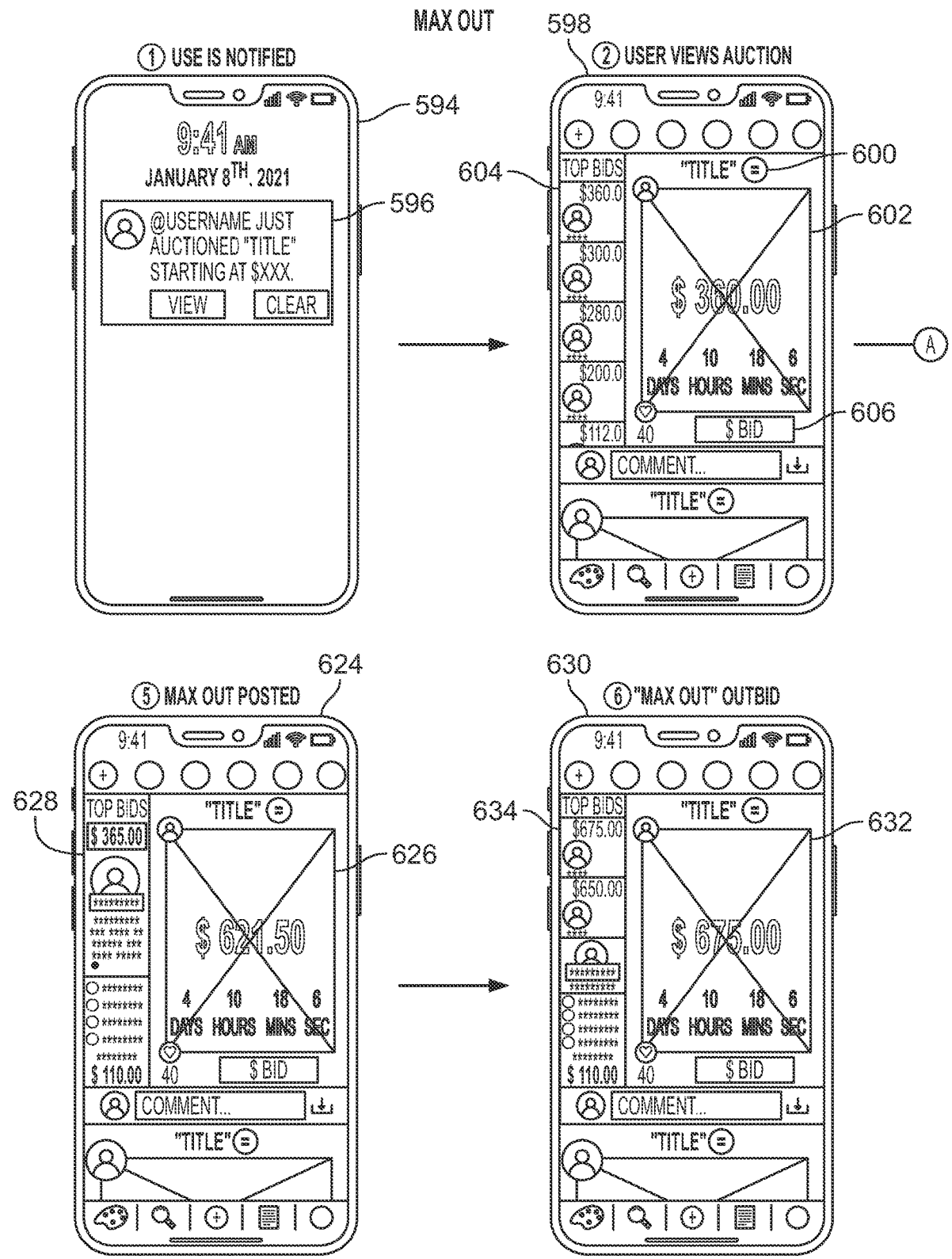
FIG. 9 is a flowchart illustrating a user interface with a max out option selection within an exemplary creative content interface system of the present disclosure.
Figure 9:
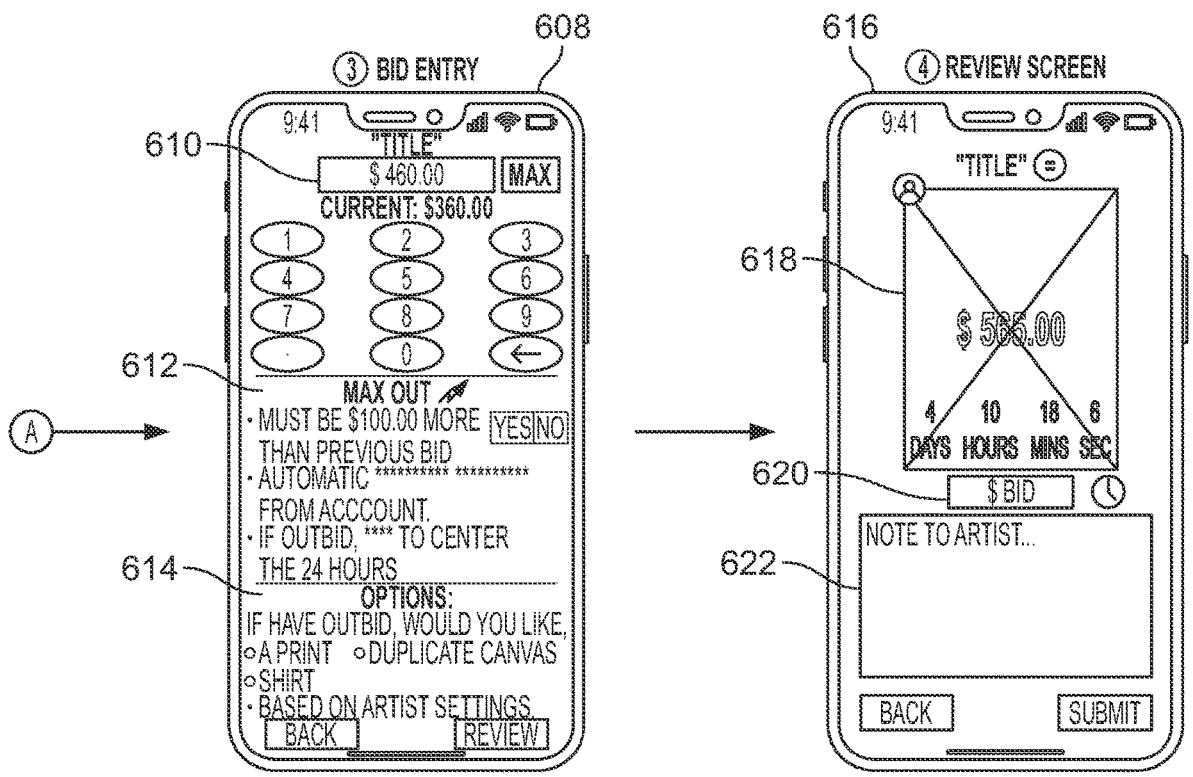

FIG. 9 is a flowchart illustrating a user interface with a max out option selection within the system 100. At interface 594, the user either receives a notification 596 on their mobile device or can view the auction information via the timeline of the system 100. The interface 598 includes a section 600 with details about the auction, including a section 602 with the creative content, the highest bid amount, and the time period remaining for the auction. Section 604 includes each of the latest bids on the creative content, with the highest bid at the top. The user can therefore visualize the initial minimum bid to start the auction, and the subsequent bids received. Button 606 can be used to input a bid offer on the creative content, thereby participating in the auction.

Interface 608 is the bid entry screen for participating in the auction. In section 610, the user can enter a bid amount using the numerical keypad provided in the interface 608. If a regular bid offer is placed, the bid incrementally outbids the next highest bid by a predetermined amount (e.g., by $5, $10, $20, or the like). The user is notified electronically that the maximum bid has been reached is allowed to enter a new maximum bid, if desired. Optionally, the user can select the max out option in section 612. If the max out option is selected, the system 100 will automatically bid the maximum amount the user is willing to pay for the creative content. For example, if the current bid is $100 and the user's maximum bid is set at $500, the bidding would automatically increase to $500 for the item (without considering the incremental bids of other bidders). The new minimum shown by the system 100 would be the user's max out offer plus 10% of the amount. If another user outbids/has a higher bid in place but is participating in an incremental manner, the max out entry would be outbid and the user would be notified. The user is able to counteroffer the max out offer for 24 hours. In section 614, the user can optionally choose alternative merchandise if they are outbid by others in the auction.

Interface 616 provides a review screen of the bid being placed, with details of the creative content provided in section 618 and the big amount in section 620. The buyer can optionally enter a note to the seller/artist in section 622. Once confirmed, the bid (or max out) is transmitted and displayed in the timeline of the system 100. Interface 624 shows the max out bid posted to the timeline, with the section 626 indicating the minimum bid necessary to outbid the max bid option. Section 628 shows information on the top bidder. Interface 630 provides a timeline view of a max out bid being outbid, with the next minimum bid displayed in section 632 and the top bid information provided in section 634. The max out bid is therefore visible to both the seller and other bidders, allowing other bidders to potentially outbid the max out bid amount. The max out option therefore allows for customized bidding on the creative content, by allowing the user to bypass the incremental bidding process and automatically bid the highest desired amount for the creative content. Such max out bidding is unavailable in traditional electronic auction interfaces. The option provided by the system 100 allows the buyer to indicate to the seller that they are interested in purchasing the creative content without the incremental bidding, and the seller has the option of either rending the auction early by accepting the max out bid, counteroffering the buyer, or continuing the auction to determine if higher bids will be received.

Figure 10:
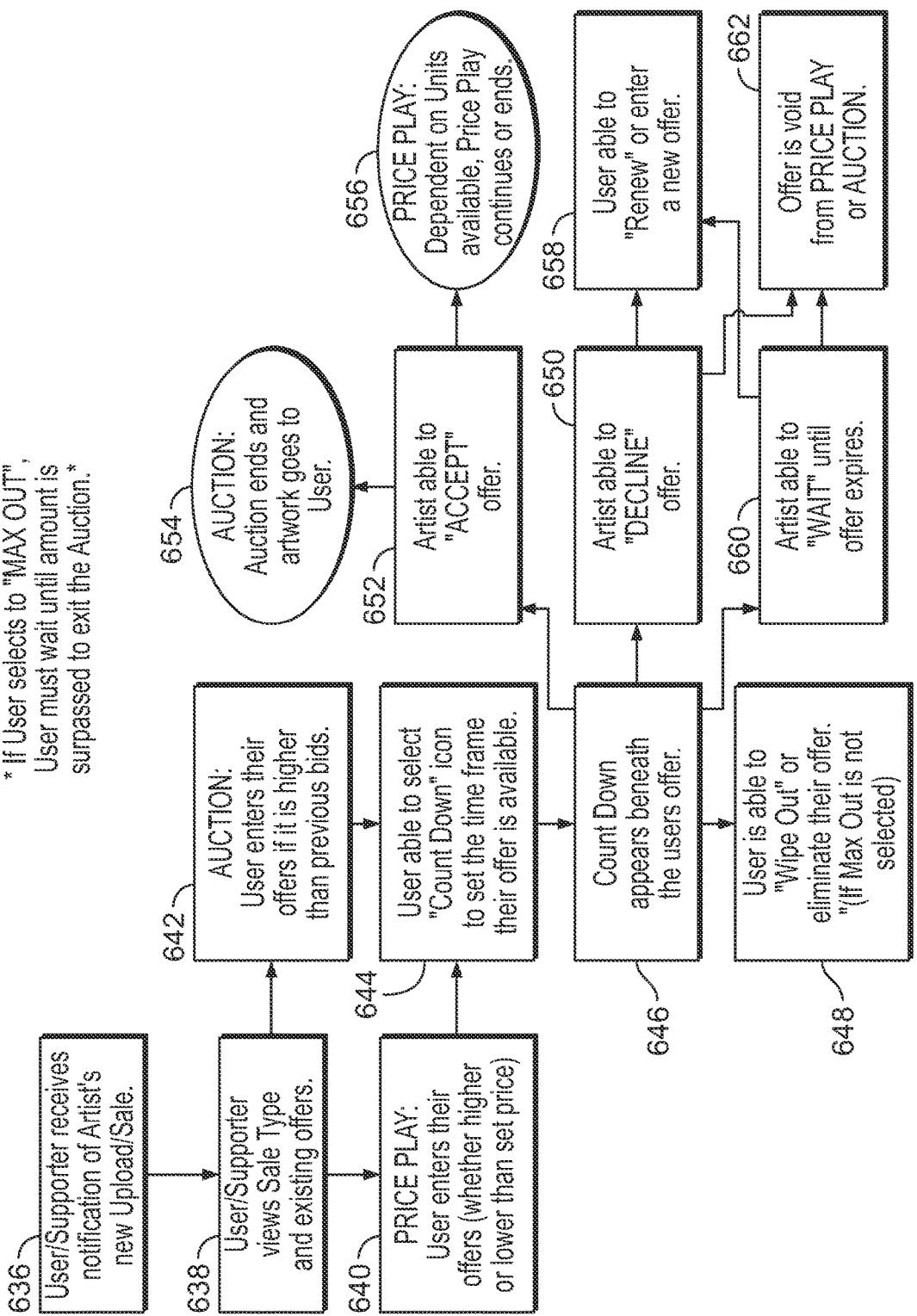
FIG. 10 is a flowchart illustrating selection of a time limit and/or wipe out option within an exemplary creative content interface system of the present disclosure.

FIG. 10 is a flowchart illustrating selection of a time limit and/or wipe out option within the system 100. In particular, the system 100 allows users additional features for customization in the form of setting a customized amount of time that a bid and/or offer is available for another user to accept or respond to. Rather than a predetermined amount of time, or an unlimited amount of time, for the other user to respond, the system 100 allows the user placing a bid, offer, or counteroffer to set a specific time period the offer is capable of being accepted, placing additional pressure on the other user to respond. Similar to the seller's ability to designate the duration of the auction/availability of the creative content, the user/buyer has a similar right/ability to set the time they are willing to wait for a response from the other user. When the user/buyer is bidding or attempting to purchase the creative content, they need to be cognizant of their bank accounts or increase the intensity for the seller to accept. This feature also allows the user to clear any unaccepted offers whenever they desire. If the seller does not accept the offer or is waiting for a higher bid, the user can clear or "wipe out" their offer if the time period has passed. Any counteroffer must be more than or equal to the current offer plus 10%. If the seller accepts the offer, the action is over and the user/buyer is bound to purchase via the terms and conditions of the system 100. The user is unable to wipe out a max bid/max out offer.

With respect to FIG. 10, at step 636, the user/supporter can receive a notification of the artist's new upload/sale of creative content. At step 638, the user/supporter views the sale type and the existing offers. At step 640, if the transaction is a price play, the user enters their offer (whether higher or lower than the set price). At step 642, if the transaction is an auction, the user enters their offers if it is higher than previous bids. At step 644, the user is able to select the "count down" icon of the interface to set the time frame their offer is available. The time frame is customizable based on each respective user. At step 646, the countdown appears beneath the user's offer. At step 648, the user is able to "wipe out" or eliminate/retract their offer. If the offer is a max out offer, it cannot be wiped out.

At step 650, the seller/artist is able to decline the offer. At step 652, the seller/artist is able to accept the offer. If the transaction is an auction, at step 654, the auction ends and the creative content goes to the user with the accepted offer. If the transaction is a price play, at step 656, dependent on the number of units of the creative content available, the price play continues or ends. At step 650, if the seller/artist declines the offer, the user is able to renew or enter a new offer at step 658, or the offer is void rom the price play or auction at step 662. In some instances, the seller/artist can wait for the countdown of the offer to expire at step 660, rather than taking any action to respond.

Figure 11:
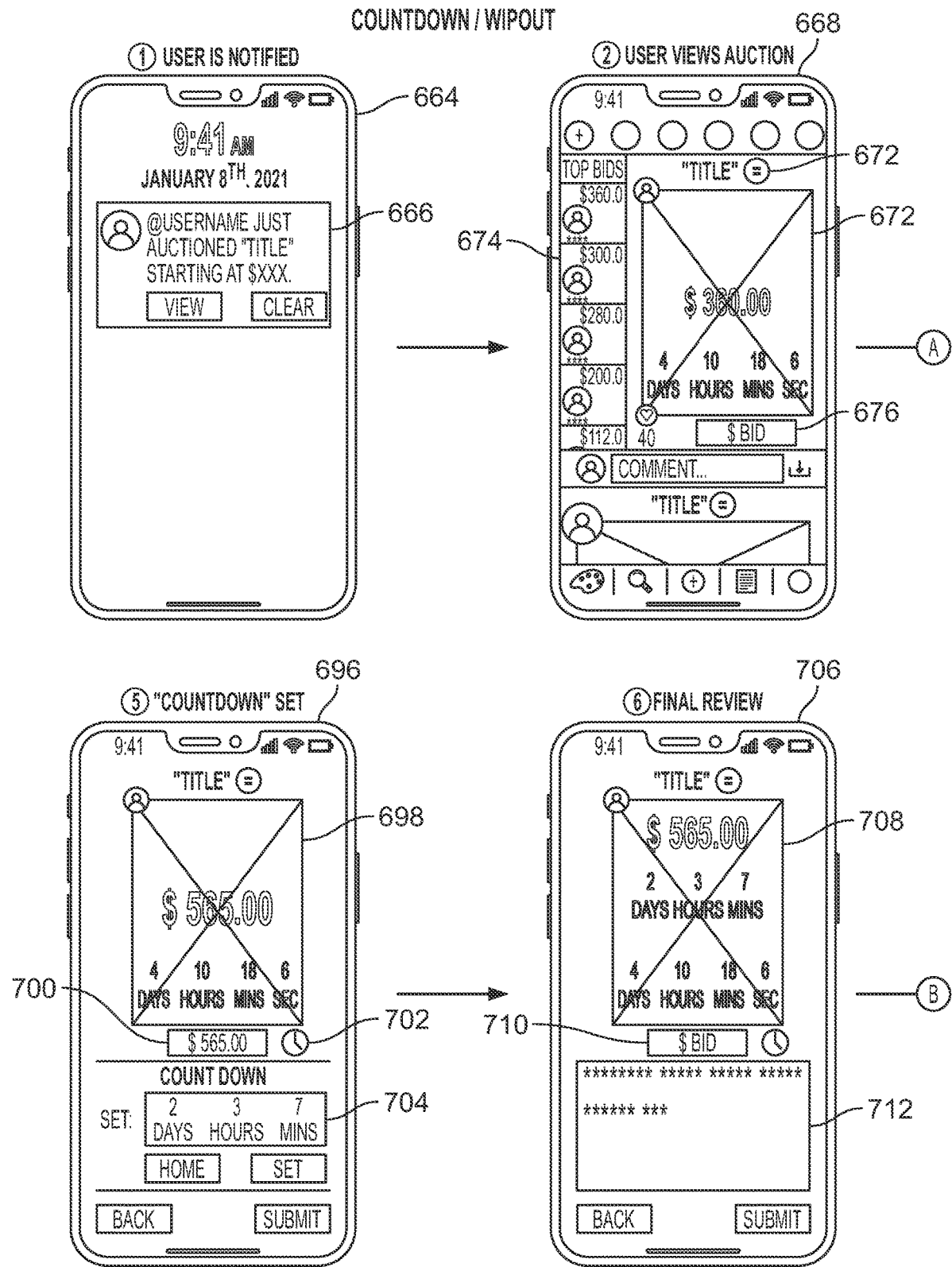
FIG. 11 is a flowchart illustrating a user interface with a time limit and/or wipe out option selection within an exemplary creative content interface system of the present disclosure.
Figure 11:
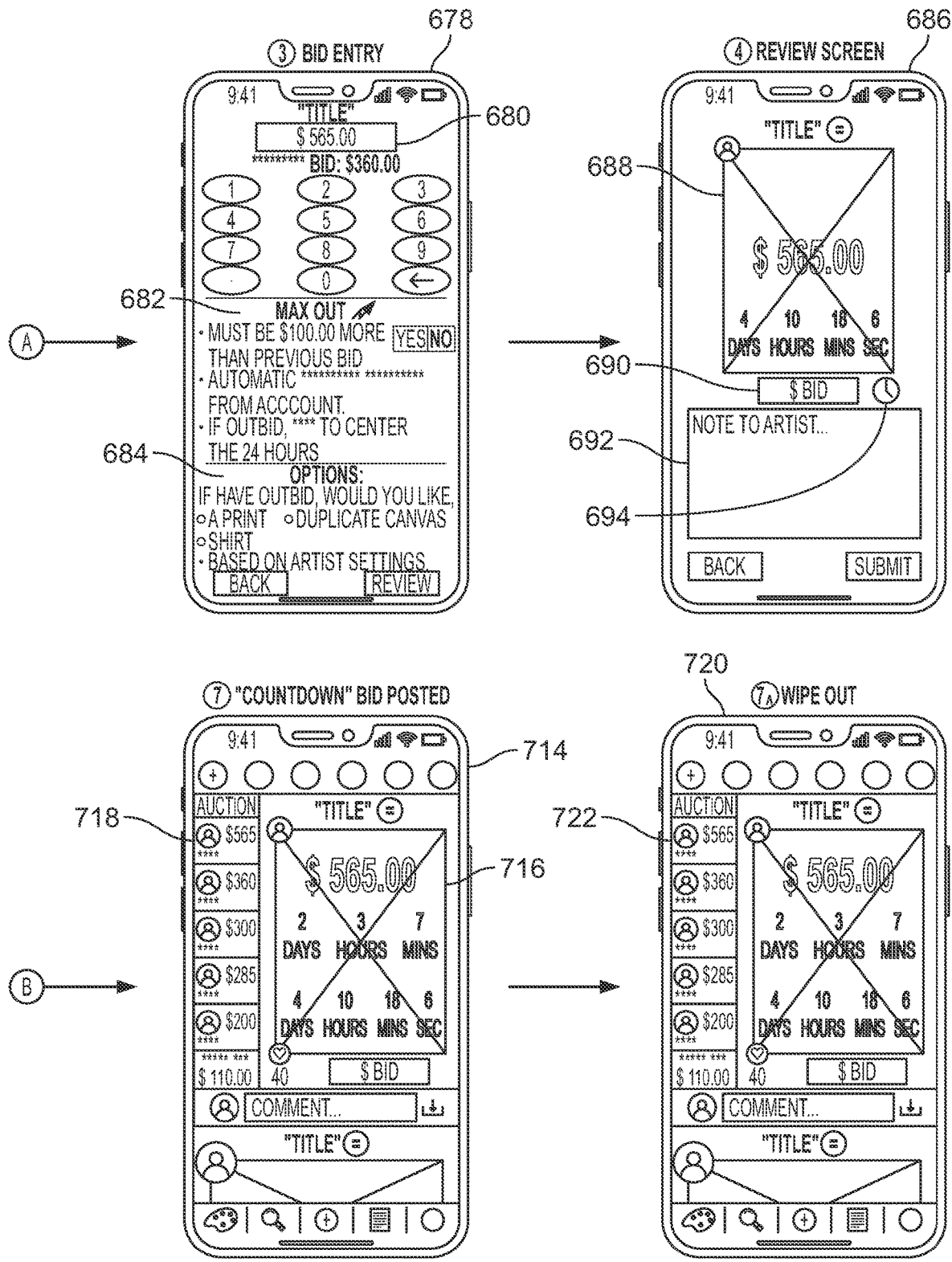

FIG. 11 is a flowchart illustrating a user interface with a time limit and/or wipe out option selection within the system 100. The interface 664 provides an electronic notification 666 to the user regarding the sale initiated by the other user(s). The interface 668 includes a section 670 with a representation of the creative content, the highest bid in the auction, and the time remaining in the auction. A button 672 can be used to access additional details of the auction, and the section 674 provides current top bids in the auction. The user can enter a bid using button 676. The interface 678 provides means for entering a bid for the auction, with a section 680 for entering the bid amount using the numerical keypad, a section 682 for selecting whether a max out option is desired, and a section 684 with additional options regarding obtaining the creative content. The offer can be wiped out or retracted by the user at any time, unless the max out option is used. The interface 686 provides a review screen for the offer, including a section 688 with the bid amount and the time remaining in the auction, an option to update the bid amount using button 690, an optional note section 692, and a countdown button 694.

At interface 696, section 698 provides details regarding the bid being placed with section 700 indicating the bid price. Button 702 can be selected to activate the countdown section 704 in which the user can input the desired time period for pendency of the bid. The interface 696 therefore provides another customizable option for the buyer to create additional control over the offer, and necessitates a response from the other user/seller within the selected timeframe. If the buyer would prefer to put pressure on the seller, a short period of time can be selected for the countdown. The interface 706 provides a final review of the offer being made, with section 708 depicting the bid price, the time remaining in the auction, and the countdown period. The user can select the bid button 710 to modify the bid. Section 712 includes additional details about the bid, such as notes to the seller.

At interface 714, the countdown bid is posted to the timeline and visible to the seller. Section 716 includes the bid amount, the time remaining in the auction, and the countdown period. The section 718 includes other bids for the creative content. The interface 720 allows the seller/user to respond to the countdown offer. One option for the seller is to ignore the countdown bid completely, in which case the bid expires on its own after the countdown time period has ended. The seller can respond by either accepting or rejecting the bid in the section 722. In some embodiments, if the seller ignores the bid, the user offering the bid can wipe out the offer, thereby eliminating the bid from consideration. The user can wipe out the bid before the countdown is completed, so long as the seller does not accept the offer before it is retracted.

Figure 12:
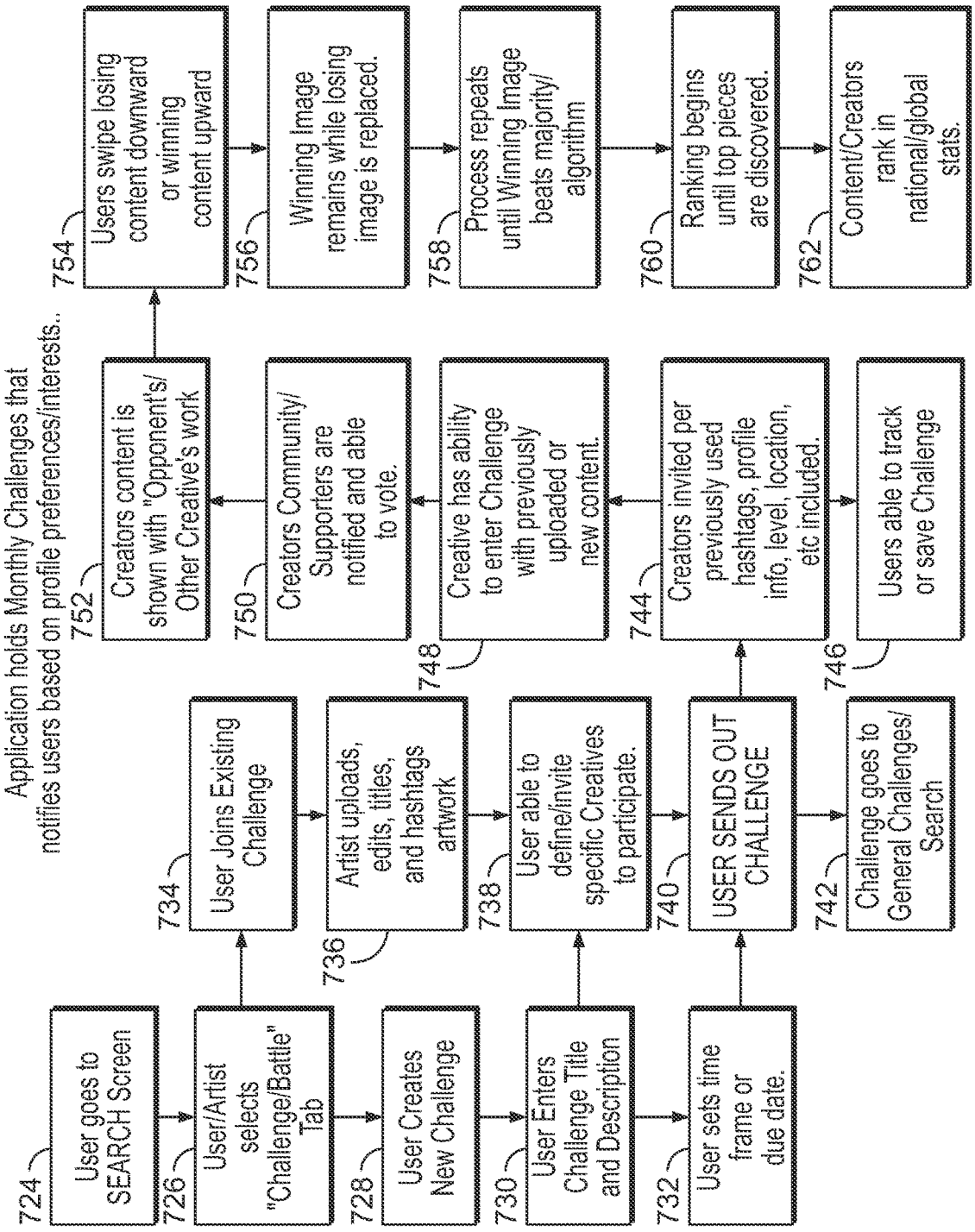
FIG. 12 is a flowchart illustrating selection of a challenge within an exemplary creative content interface system of the present disclosure.

FIG. 12 is a flowchart illustrating selection of a challenge within the system 100. In particular, the system 100 provides different means for user interaction. One of such means can include a challenge and/or gamified feature that can be used to compare the creative content (art or music) to other similar media. Users can vote on which creative content they prefer the most through multiple rounds, with the system 100 automatically ranking the user's creative content relative to other media. Such ranking can be worldwide, nationwide or can be more narrowly focused on a geographic area (e.g., state, zip code, region, or the like).

Users can rank creative content based on categories, challenges, genres, themes, combinations thereof, or the like. In some embodiments, the system 100 can release an overall theme, topic or cause for artists to execute their interpretation/vision of a challenge into audio or visual art. Once the creative content is completed, the user can upload the creative content to the system 100 with a title, description, hashtags, and/or categorize their work. The creative content is transmitted via notifications to the user's audience and/or a primary page associated with the system 100 (e.g., the timeline visible by all users). The timeline can display creative content in an assorted manner from every artist/user who opts to participate in the challenge.

Each "battle" of the challenge includes at least two creative contents. The audience/users interact with the challenge by selecting which creative content they prefer. In some embodiments, swiping the losing creative content downwards results in replacement of the losing creative content with a new competing creative content. In some embodiments, double tapping or swiping on a creative content indicates that it is the winning piece. The favorite piece remains to compete again, while the losing piece drops off the screen. The cycle beings again for any number of rounds the user is interested in participating in. Once a piece (e.g., creative content) beats out the competing pieces at least three times, it rises in the battle until the piece is only competing with equally ranged art. This continues until the individual user, and eventually the initial competition, is down to one final winning piece. The system 100 automatically ranks each of the pieces in the competition in real-time as selection is made by users, and displays the ranked list in real-time in the user interface as the competition is ongoing. In some instances, the system 100 can display the ranked list after the competition has been completed.

The challenge provides an exciting interaction for users and means for providing feedback on the preferred creative content. The creative content that rose above others gains traction and visibility due to the voter's/user's interest. Creators are able to see their creative content rank and rise in real-time. The challenge can continue until the #1 creative content is pinned and shared. Accolades and wins can be listed within the creator's profile. Eventually, after enough participation, the competitions can spotlight the top creators by different categories. Success can be evaluated by how long the artist remains in the top of the charts per category. In some embodiments, challenges or competitions can occur daily or weekly. In some embodiments, the gamified ranking system can occur when the user searches a hashtag or genre. Images can appear two at a time for the viewer to select their favorite. One image can disappear from the screen to be replaced by another within the same parameters. The ranking/win can be automatically calculated by an algorithm programmed into the system 100.

The system 100 can allow the community and verified accounts (e.g., brands, business establishments, celebrities, schools, or the like) to initiate and create their own battles/challenges. The process can include creating a name and description for the intended challenge, and selecting a preferred genre, skill level, or the like, desired for participation in the challenge. The system 100 can automatically send the challenge to creators based on profile information and content (e.g., preferred medium, years of experience, genre, location, or the like). The creators can indicate whether they accept or decline the challenge offer. If the creator accepts, the initiator of the challenge is notified, which beings compilation of a list of participants. The competition begins when at least two participants have uploaded their work. Once the creator uploads, titles, describes, hashtags their creative content, the audience is notified. The account that creates the challenge can set a deadline or time frame for ending the challenge (e.g., 24 hours, 1 week, 1 month, quarterly, annually, or the like). The rank is displayed in real-time based on selection/feedback from users on the creative content.

In some embodiments, the system 100 can be used by creators to initiate a battle/competition with other creators. Such process can include the steps of creating the name and description of the intended challenge, and uploading creative content with title, hashtags, medium, and other information for other users to reference/view. The creator tags initial creators, the city, level (e.g., novice, intermediate, advanced), genre, or the like. The creative content is listed under the challenge by itself until at least one other artist enters the challenge. Once the other artist uploads their creative content, the challenge beings. Ranking/voting is open to all users on the system 100. The artist who creates the challenge can choose whether the challenge is ongoing or on a set time frame. Rank is displayed in real-time.

With respect to FIG. 12, at step 724, the user can access a search screen of the interface. At step 726, the user/artist selects challenges/battle tab or button, and at step 728 the user creates a new challenge. At step 730, the user enters the challenge title and description, and at step 732, the user sets the time frame or due date for the challenge. At step 734, rather than creating a new challenge, the user can join an existing challenge. At step 736, the user can upload creative content, edit the content, add a title, description and hashtags. At step 738, the user can invite other specific users to participate in the challenge. At step 740, the user sends out notifications to other users regarding the challenge. At step 742, the challenge can go to the general challenges search such that other users can locate the challenge.

At step 744, users receive notifications regarding invitations to the challenge. At step 746, the users are able to save and track the challenge, even if they do not participate in the challenge. At step 748, the user can enter the challenge with a previously uploaded or new creative content. At step 750, the user community/supporters are notified and able to vote in the challenge. At step 752, the user's content is shown with an "opponent's" content as comparison for the vote by other users. At step 754, users can swipe the losing content downward or the winning content upward. At step 756, the winning image remains while the losing image is replaced by another image for further competition. At step 758, the process repeats until the winning image beats the majority. At step 760, the internal algorithm ranks the creative content based on responses from the users at each stage in real-time until the top pieces are discovered. At step 762, the creative content/user rank statistics are made publicly available (or could be made available in real-time as the challenge is ongoing).

Figure 13:
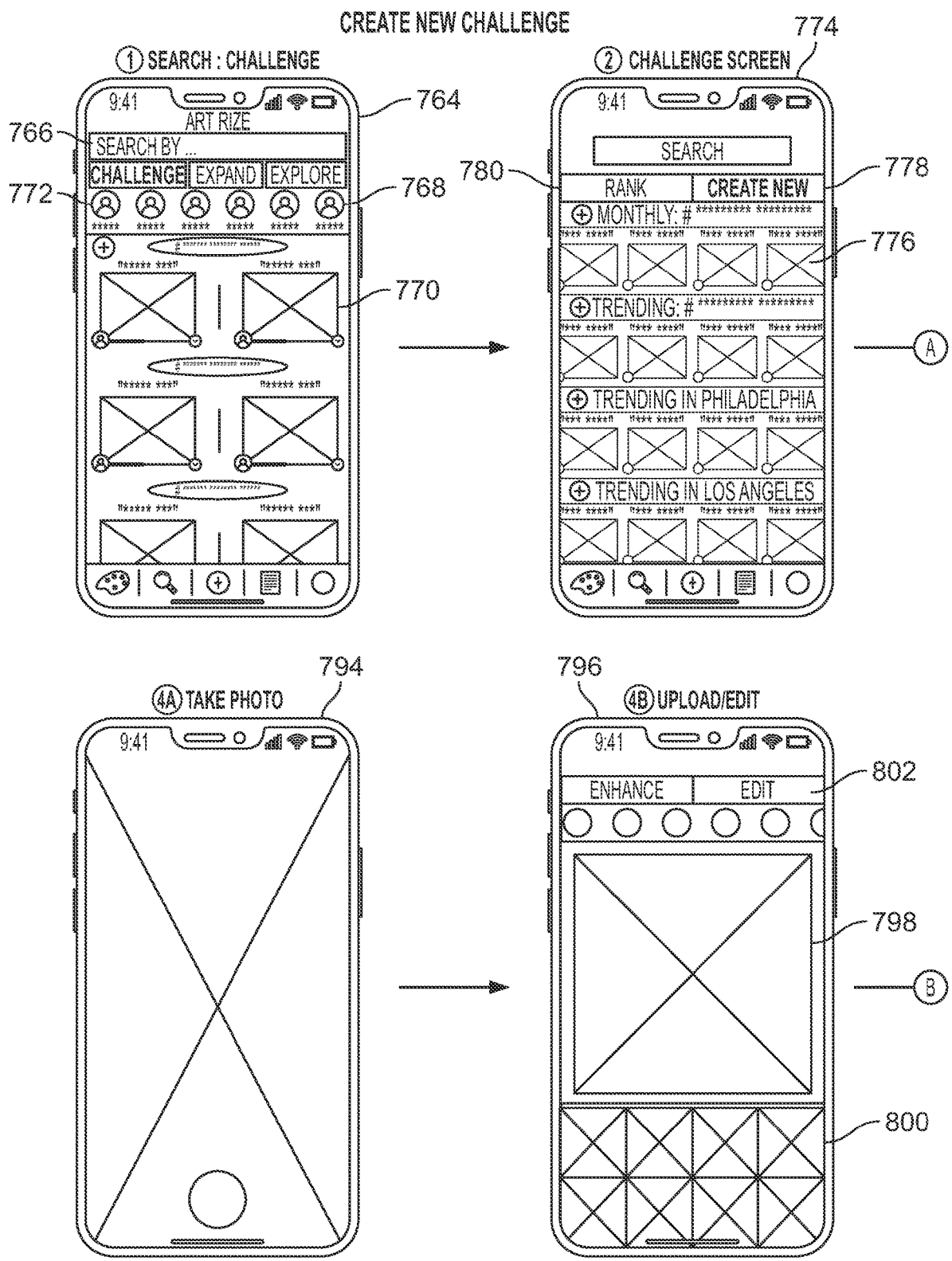
FIG. 13 is a flowchart illustrating a user interface with a challenge creation within an exemplary creative content interface system of the present disclosure.
Figure 13:
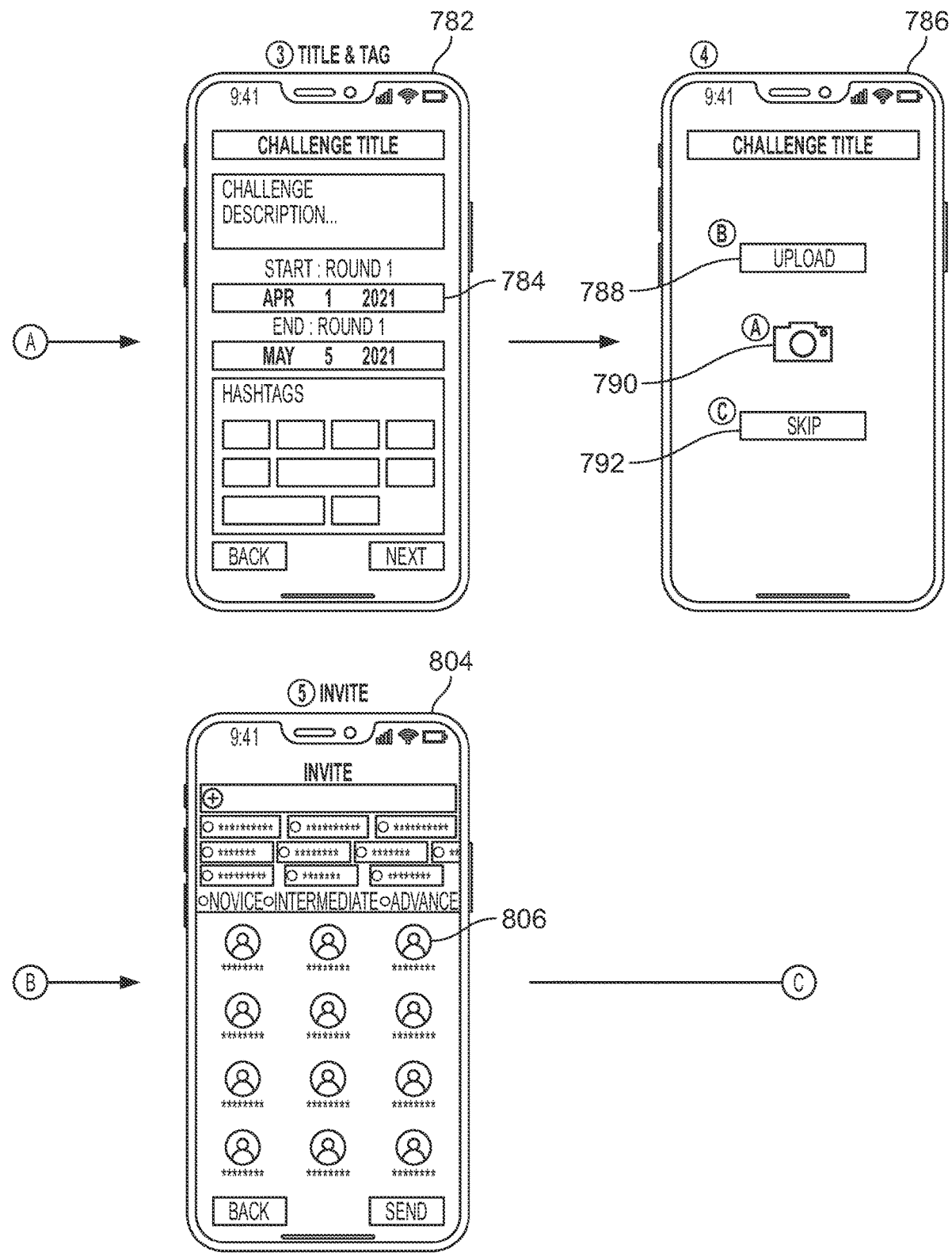
Figure 13:
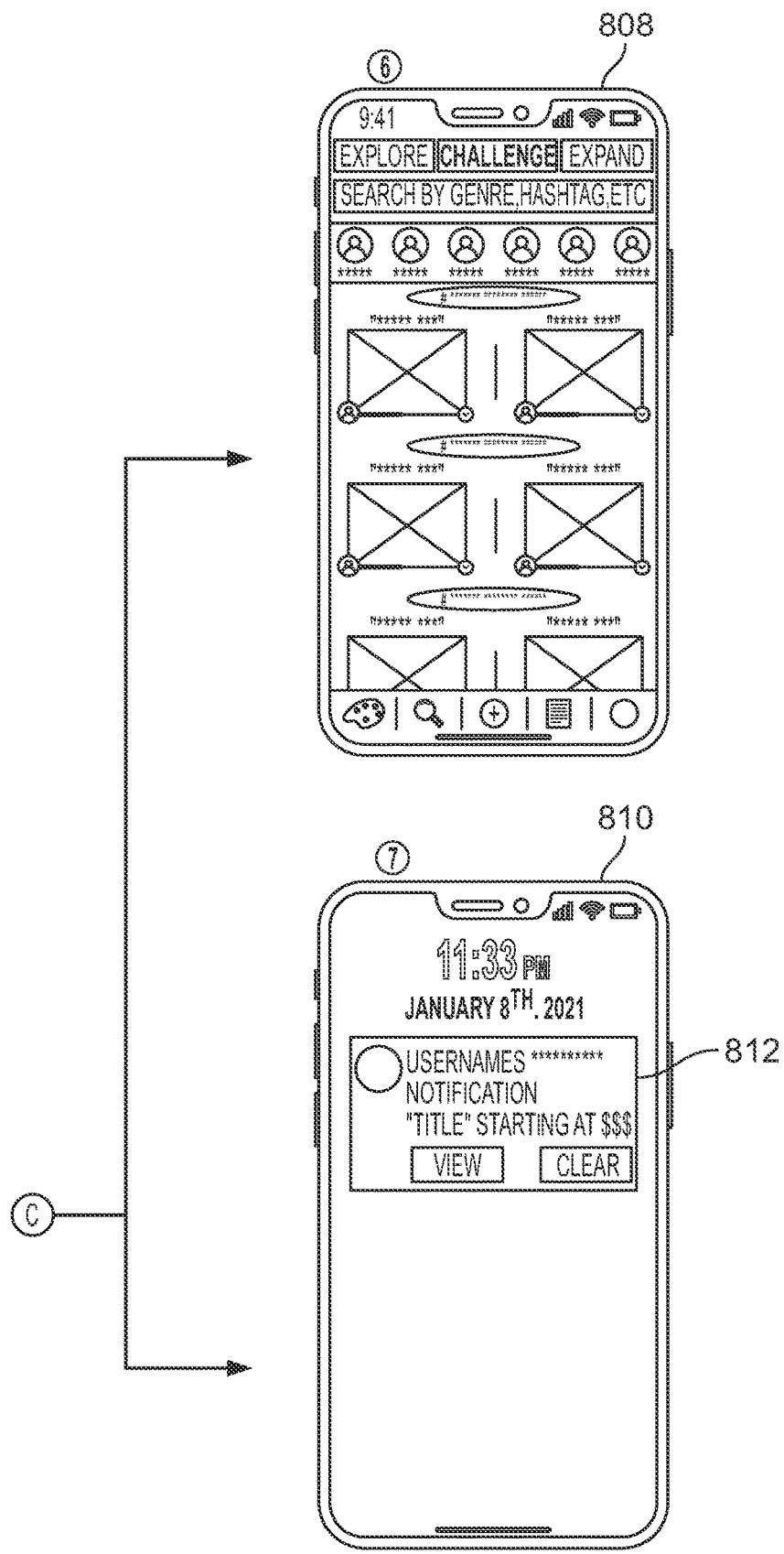

FIG. 13 is a flowchart illustrating a user interface with a new challenge creation within the system 100. The user can click or tap on an "add" icon to create a new challenge and is taken to a challenge screen or interface. The interface 764 includes a search bar 766 for searching challenges by location, username, genre, medium, color, hashtags, combinations thereof, or the like. The interface 764 includes a user section 768 in which the user can browse through other individuals who are participating in a challenge. The user section 768 can include users the individual is following. The section 770 includes existing challenges that the user can join or can monitor. The challenges can be ordered by location, user interests, time of creation, or the like. An add button 772 can be actuated to create a new challenge. The interface 774 provides a detailed view of the challenges screen, with section 776 showing trending challenges and button 778 actuated to create a new challenge. Button 780 can be used to monitor rankings of users or other creative content participating in challenges.

At interface 782, the user can create a challenge title, description, and hashtags. In some embodiments, the user can select specific users to invite to the challenge. Section 784 can be used to add a start date/time and/or an end date/time for the challenge. At interface 786, the user is able to upload 788 creative content, capture 790 an image of the creative content with a camera of the device, or skip 792 the step if the creative content is not ready. At interface 794, a camera of the device can be used to capture an image of the creative content. At interface 796, creative content 798 can be selected from an electronic database/library 800, and a menu 802 can be used to edit or enhance the creative content before uploading. If desired, at interface 804, the user can search and invite other users 806 to participate in the challenge. Alternatively, the challenge can be transmitted generally to all users of the system 100. Once added, the challenge appears in the timeline of challenges at interface 808 for all users to see. If specific users are invited to the challenge, at interface 810, notifications 812 are electronically transmitted to the users. The challenge is not active until there are two pieces of creative content uploaded to participate in the challenge.

Figure 14:
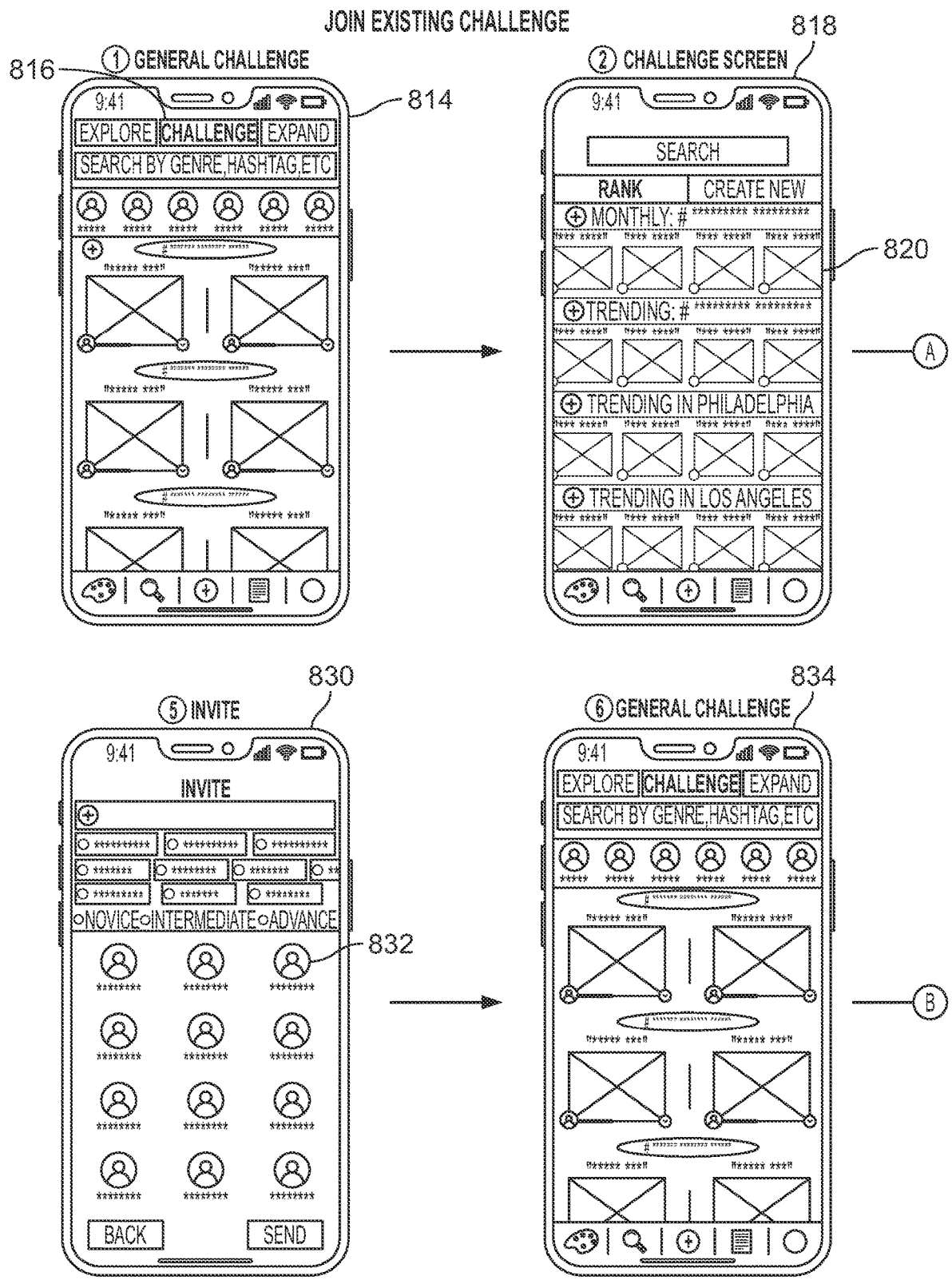
FIG. 14 is a flowchart illustrating a user interface with an existing challenge selection within an exemplary creative content interface system of the present disclosure.
Figure 14:
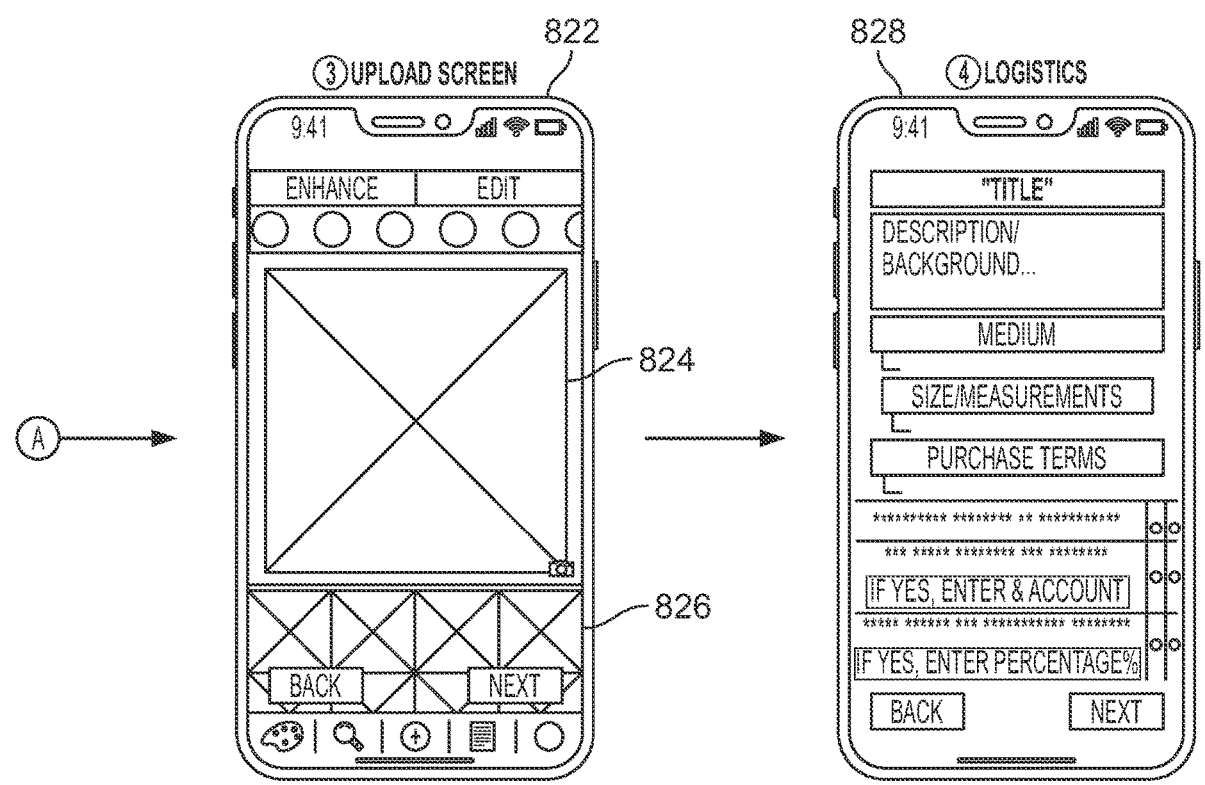

FIG. 14 is a flowchart illustrating a user interface with an existing challenge selection within the system 100. At interface 814, the user can select the challenge button 816 to join challenges one or more challenges. At interface 818, the timeline section 820 provides various challenge categories, e.g., monthly, trending, trending by geographic location, or the like. The user can select one of the top challenges, or can search for specific challenges. At interface 822, the user can select and upload their creative content 824 from an electronic library 826, or a new image can be captured. At interface 828, details related to the creative content can be added, such as the title, description, medium, size/measurements, purchase terms, or the like. At interface 830, the user can invite other participants/users 832 to participate in the challenge. The creative content is uploaded to the timeline and joins other challenges at the interface 834 for user voting. In some embodiments, specific challenges can be selected for participation, or keywords/hashtags can be used to search for a challenge.

In each challenge, two pieces of creative content are shown together on the user interface (e.g., side-by-side or above/below). The user swipes the creative content in different directions to indicate the winning piece. For example, swiping the least favorite piece downward can indicate it is the losing piece, and removes it from the screen. Swiping upward or double tapping the favorite piece can indicate it is the winning piece, and keeps it on the screen for participation in a subsequent comparison. Losing content is replaced with different content to begin the cycle again until the winning piece has the majority. New challenges of equally ranked creative content can continue and the rankings can be updated in real-time to indicate the top creative content.

Figure 15:
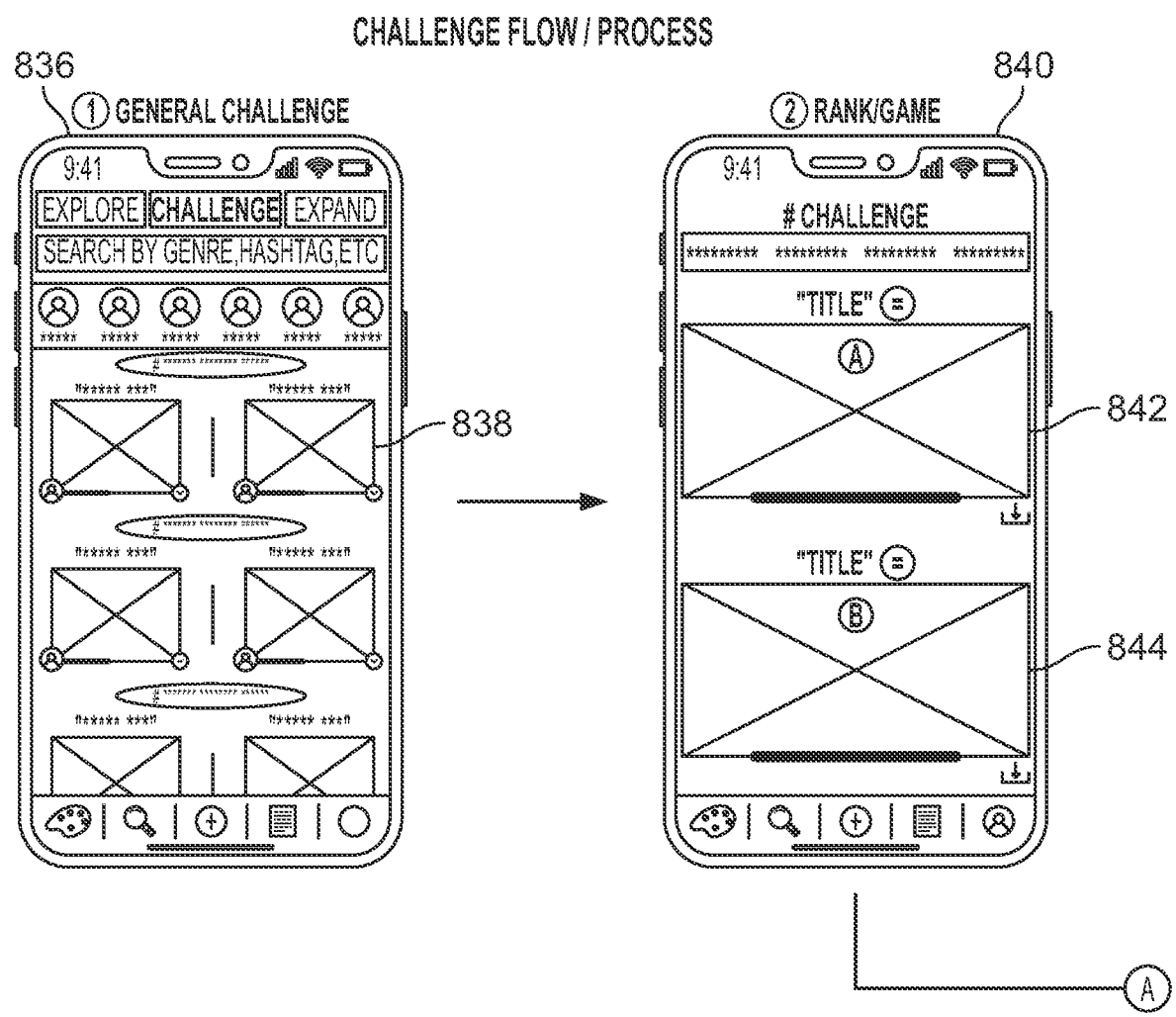
FIG. 15 is a flowchart illustrating a user interface with a challenge selection within an exemplary creative content interface system of the present disclosure.
Figure 15:
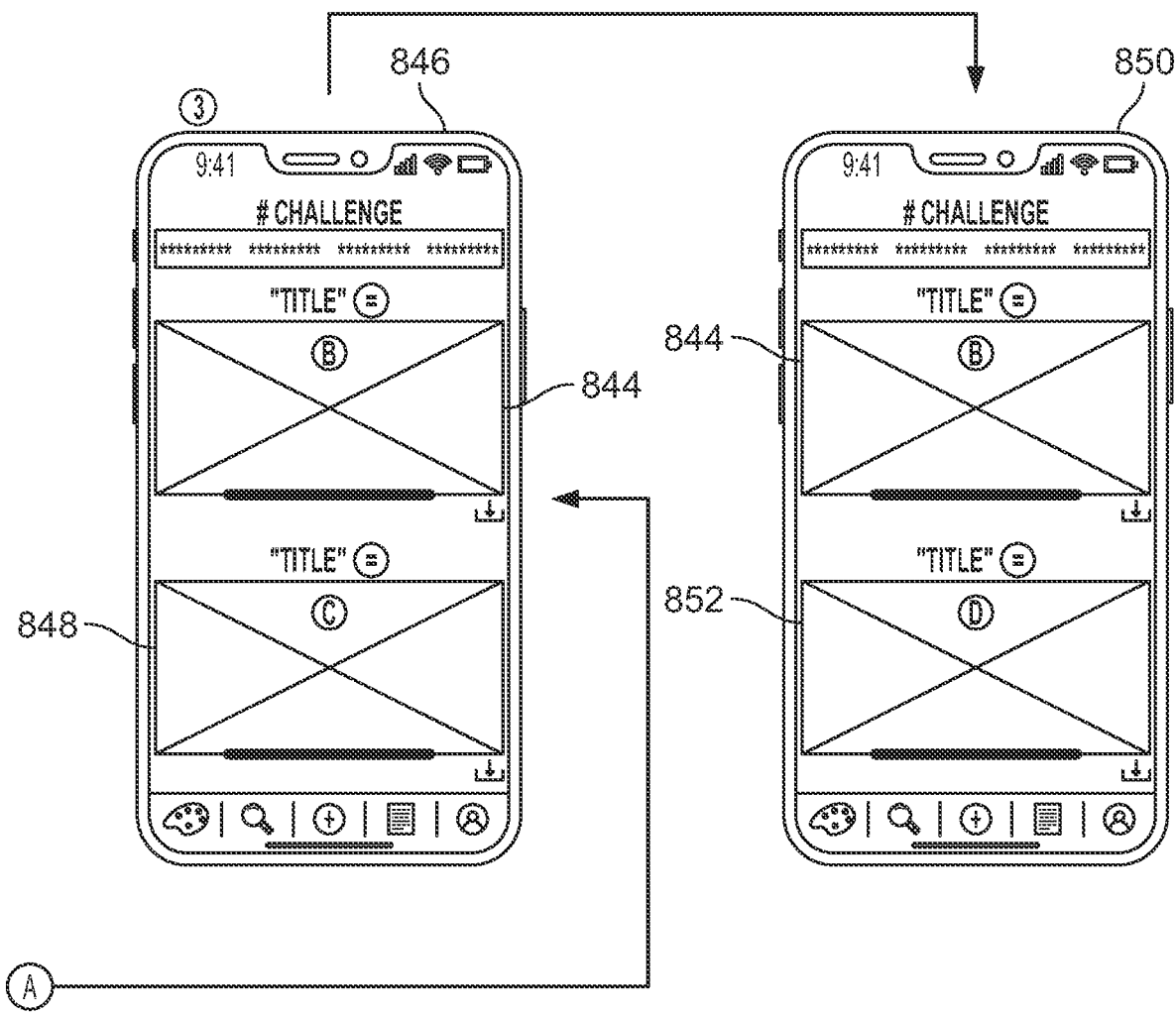

FIG. 15 is a flowchart illustrating a user interface with a challenge selection within the system 100. At interface 836, various challenges are presented in section 838. If a challenge is selected, the interface 840 is shown. In the challenge, a first piece of creative content 842 (content A) is shown above a second piece of creative content 844 (content B) to be compared and voted upon. If content 844 (content B) is chosen as the winning piece, content 842 (content A) disappears from the screen and, as shown in interface 846, another piece of creative content 848 (content C) is shown with the content 844 (content B). If the content 844 (content B) is chosen again as the winning piece, content 848 (content C) disappears from the screen and, as shown in interface 850, another piece of creative content 852 (content D) is shown with the content 844 (content B). The challenge can continue in this manner until the user decides to no longer vote. As each selection takes place, the real-time ranking of the creative content is updated. The ranking takes into account selections by all users of the system 100. Users can therefore review the real-time ranking to determine the top pieces and/or creators of the system 100.

Figure 16:
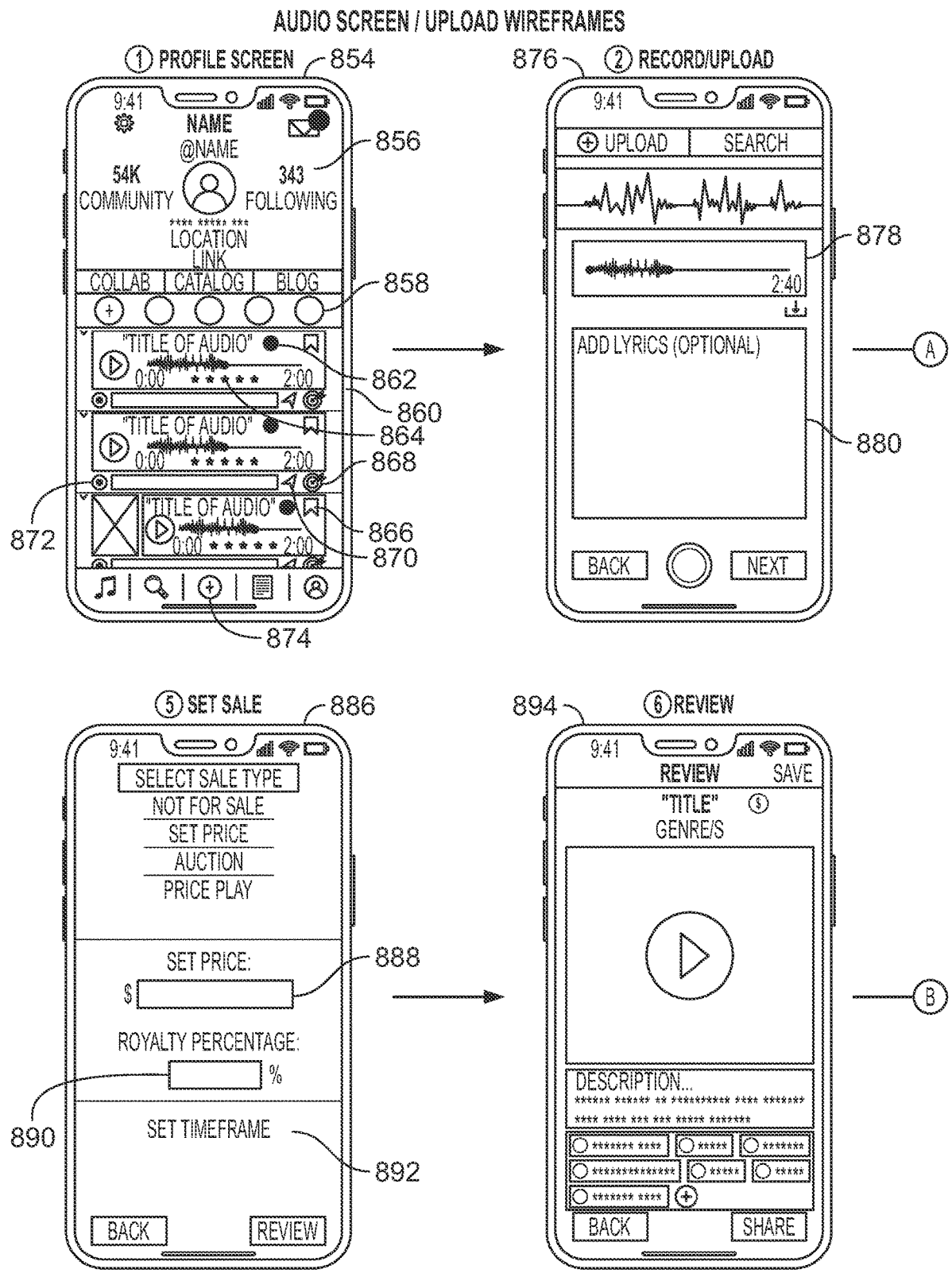
FIG. 16 is a flowchart illustrating a user interface with an audio submission within an exemplary creative content interface system of the present disclosure.
Figure 16:
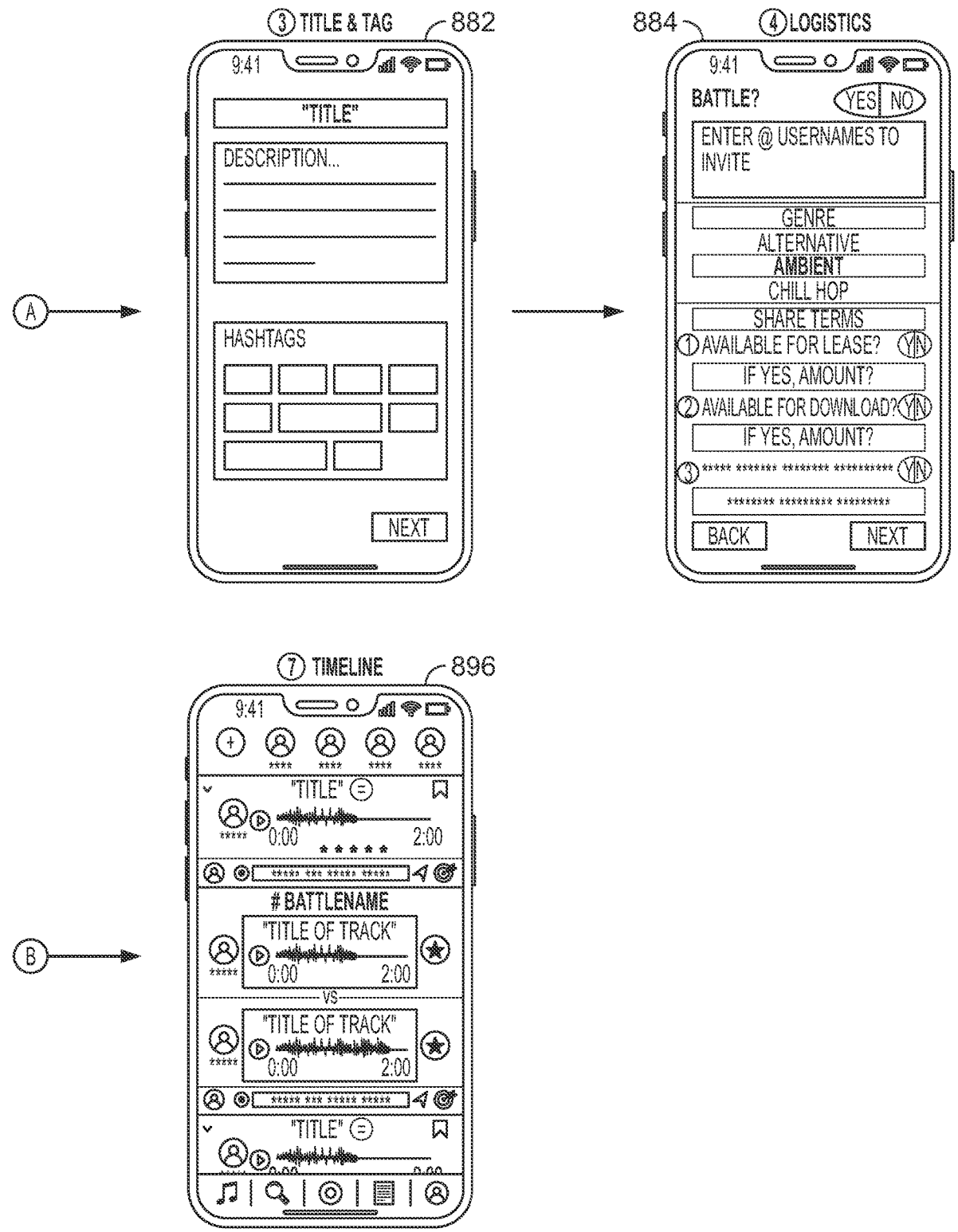

FIG. 16 is a flowchart illustrating a user interface with an audio submission within the system 100. The interface 854 can be used for audio screen and/or uploading wireframes to the system 100. The process can be substantially similar to adding visual creative content to the system 100, except for the distinctions discussed herein. At interface 854, section 856 provides user profile information, including the user's name, community, followers, location, or the like. At section 858, the user can create updates to their content. The timeline 860 of the interface 854 includes audio versions of creative content created by the user and/or other users. For each creative content, a button 862 can be actuated to obtain more information, a rating out of five stars can be selected in section 864, the creative content can be saved at bookmark 866, users can challenge the creative content by selecting button 868, the user can electronically share the creative content using the button 870, and users can record their commentary using button 872. The user can upload their own audio content using add button 874.

At interface 876, the user can record or select audio content to upload from their device. The interface 876 can include a section 878 for recording and a section 880 for optional notes or lyrics. For example, the user can copy and paste lyrics into the section 880 for use while recording the audio. The interface 882 can be used to add details regarding the creative content, such as title, description, and hashtags. The interface 884 can be used to select whether the audio will participate in challenges, add usernames to invite to the challenge, and select details of the content (e.g., genre of audio/music, sharing terms, lease/license, download options, or the like). Thus, downloads and royalty specifics can be added to the system 100 to provide different options for sharing the content. The interface 886 can be used to select the sale type for the content, e.g., not for sale, set price, auction, price play, or the like. Section 888 can be used to set the price, optionally section 890 can be used to indicate the royalty percentage, and section 892 can be used to input an optional timeframe/countdown (if applicable to sale type). The interface 894 allows for review of all details for the audio transaction. Once added to the system 100, the audio content becomes available in the timeline interface 896 (and/or the community, profile of the user).

Figure 17:
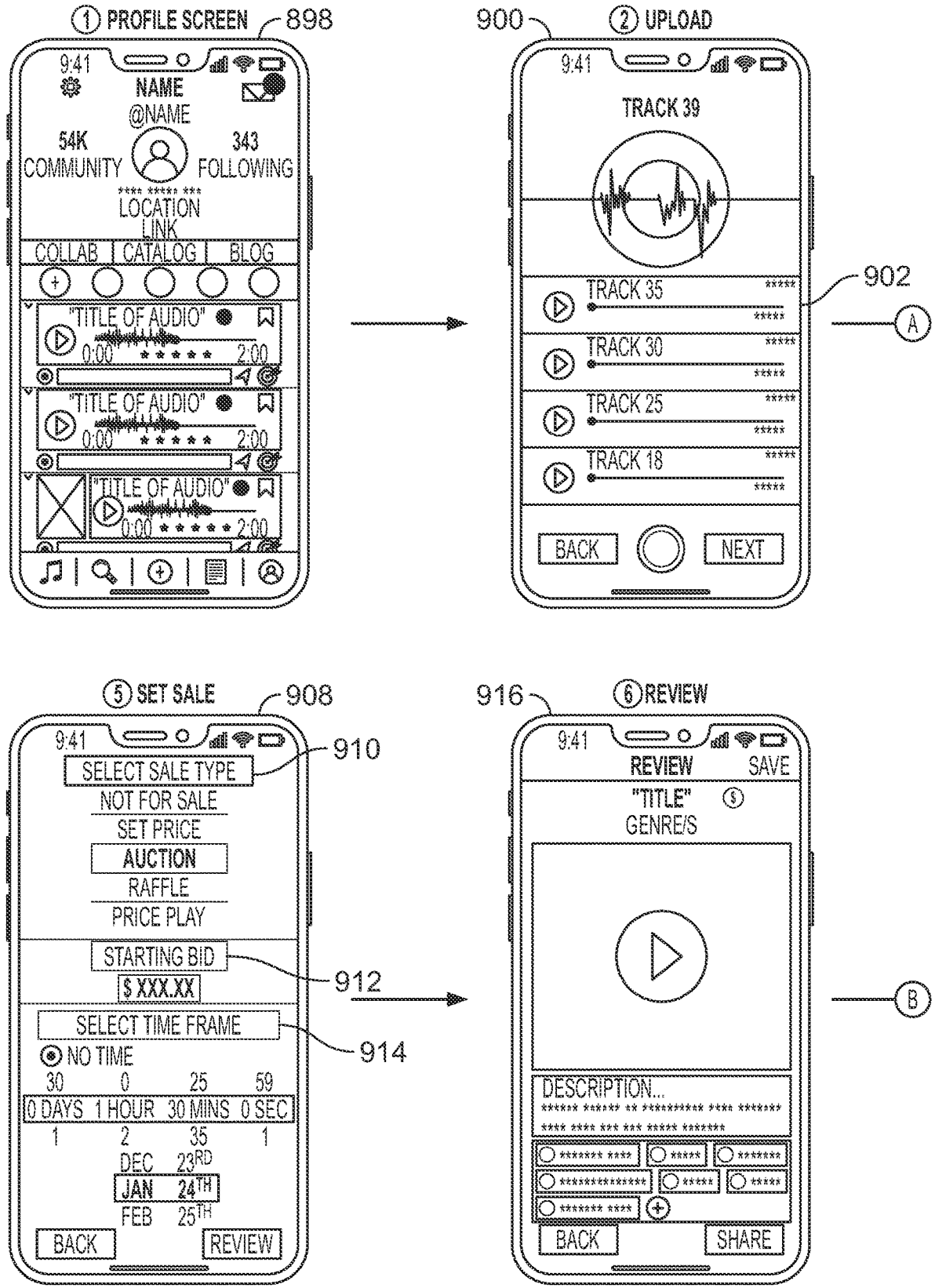
FIG. 17 is a flowchart illustrating a user interface with an audio auction style transaction within an exemplary creative content interface system of the present disclosure.
Figure 17:
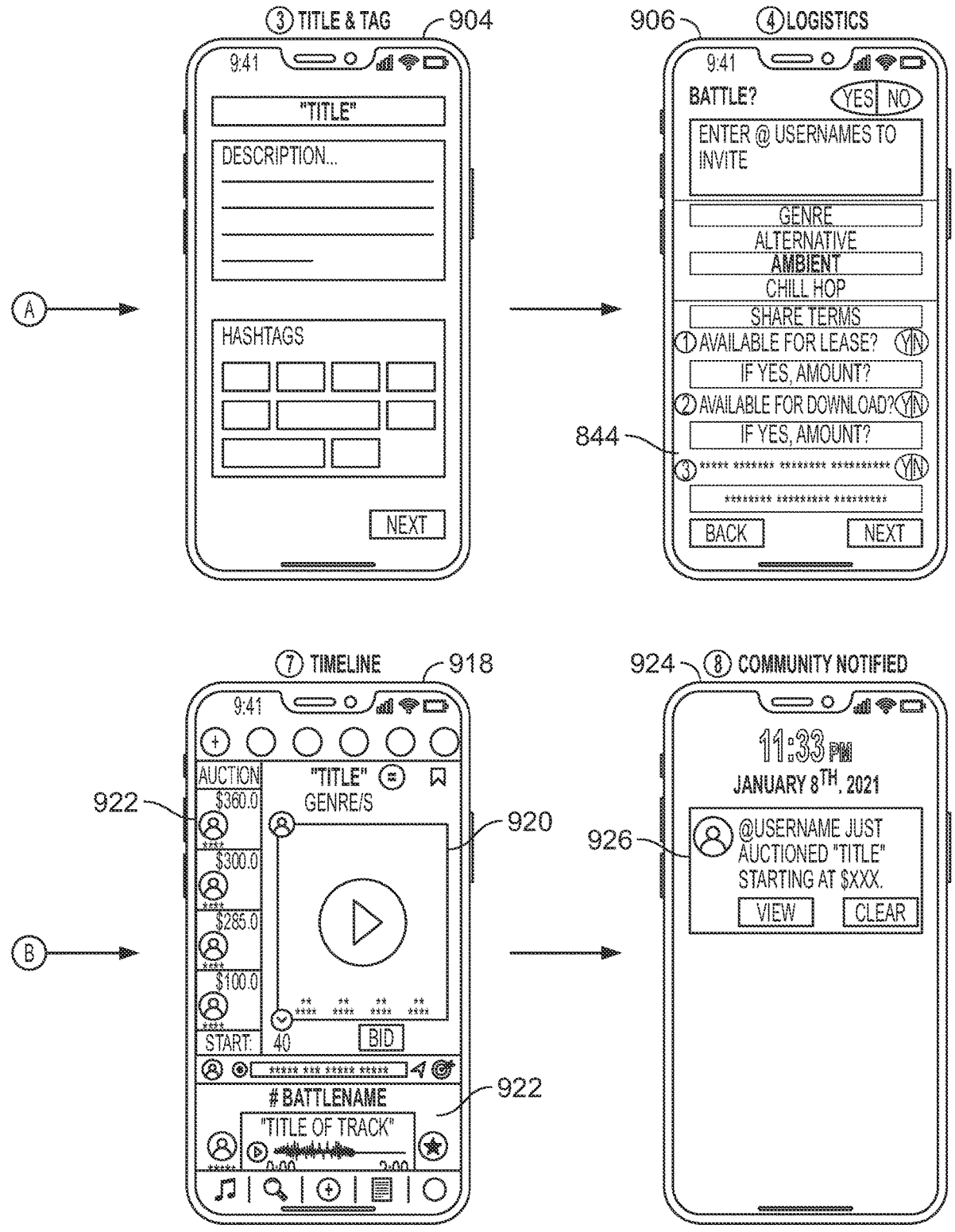

FIG. 17 is a flowchart illustrating a user interface with an audio auction style transaction within the system 100. In particular, the system 100 can be used to sell audio/music instead of artwork. FIG. 17 illustrates the auction/sales option. Interface 898 includes the timeline of audio content uploaded to the system 100, with options to record commentary, see and listen to other user comments, or the like. Interface 900 allows the user to record audio content tracks 902 for uploading to the system 100. Interface 904 allows the user to add details regarding the audio content, such as title, description, and hashtags. Interface 906 allows the user to decide if the audio content will participate in a challenge, invite usernames for the challenge, selecting the genre for the audio, share terms, lease options, royalties, and download options.

Interface 908 includes a section 910 to select the sale type (e.g., auction in this instance), a section 912 for entering the starting minimum bid, and a section 914 for entering the time frame for the auction. The interface 916 provides a review of the content before uploading to the system 100. The timeline interface 918 allows for viewing of the audio content by all users, with the section 920 including details of the selected content, and section 922 provides a scrolling area for reviewing the offers. The user is able to accept or decline offers by tapping or swiping. Section 922 can include ongoing challenges or battles related to the content. The interface 924 provides notifications 926 to users following the auction when activity takes place. In some instances, rather than a one-time purchase, the audio content can be downloaded multiple times with certain fees or royalty terms.

Figure 18:
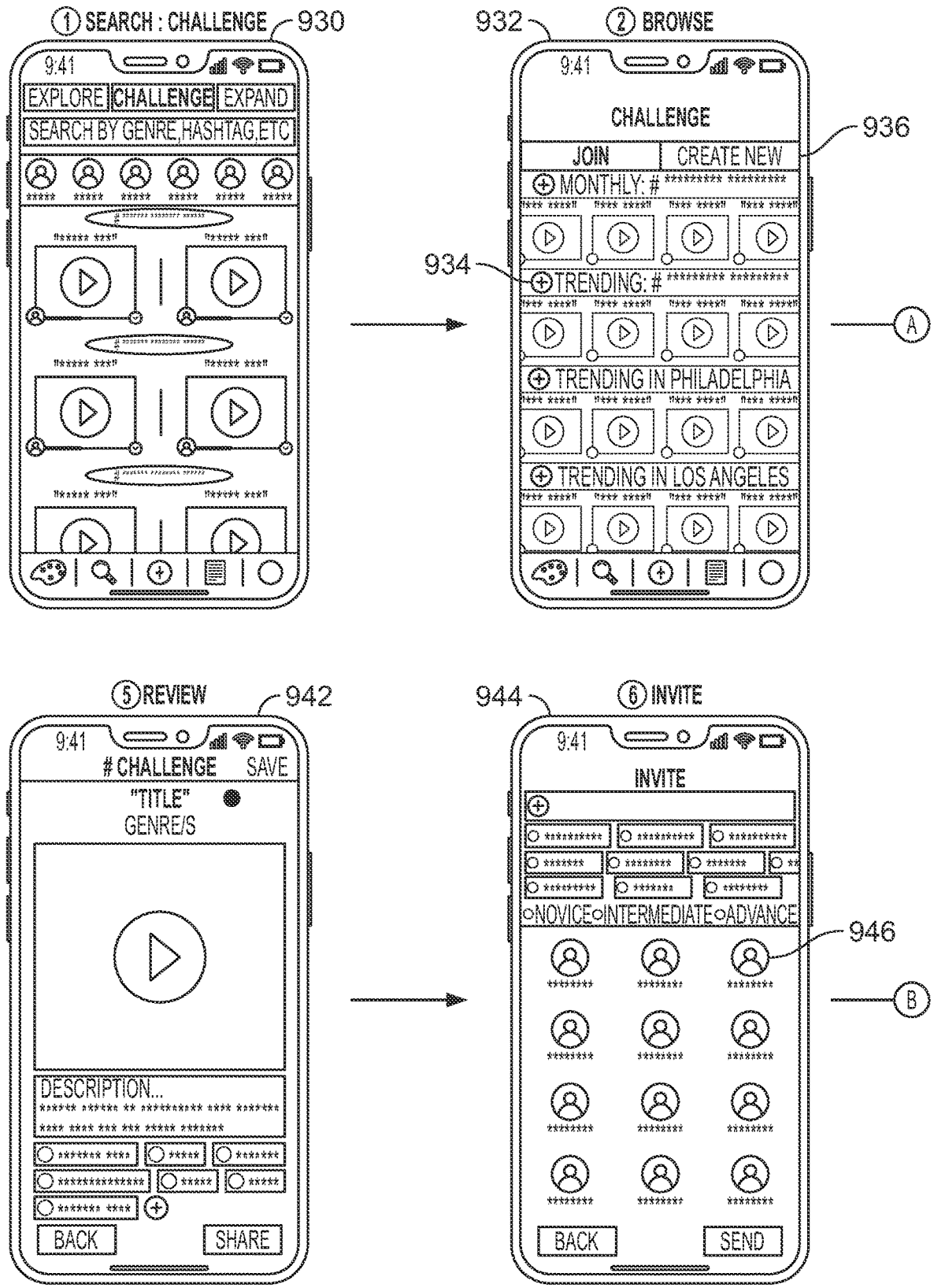
FIG. 18 is a flowchart illustrating a user interface with an audio challenge selection within an exemplary creative content interface system of the present disclosure.
Figure 18:
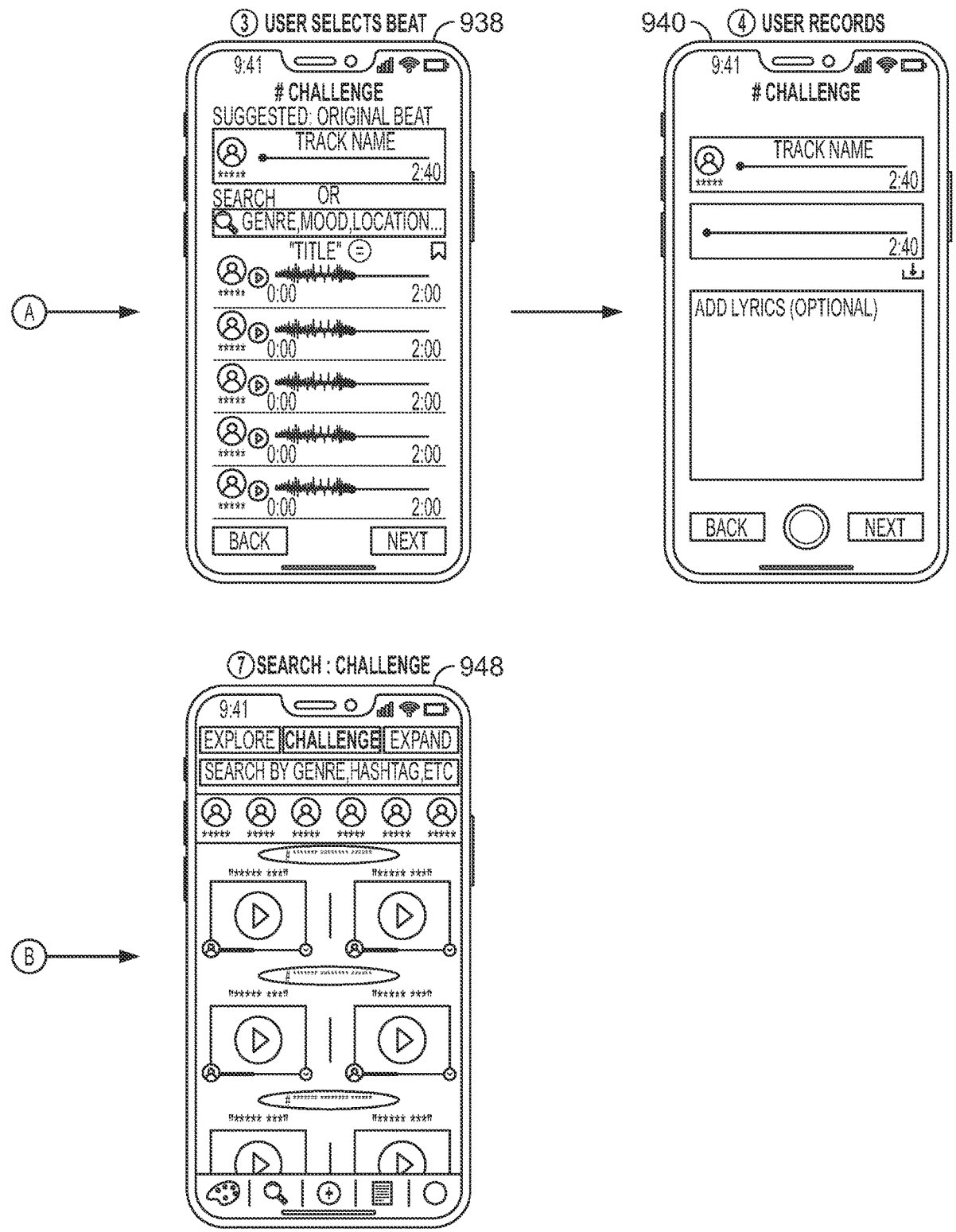

FIG. 18 is a flowchart illustrating a user interface with an audio challenge selection within the system 100. The user's profile picture can include a different color assigned to them depending on the user's status. For example, listeners can have a white ring around their profile identifying them as non-creators, while producers/lyricists can have a different color. The interface 930 provides a general view of audio content uploaded to the system 100, and interface 932 provides a detailed challenges view in which the user can browse specific challenges 934. A create new button 936 can be actuated to begin a new challenge.

At interface 938, users can browse and select beats or tracks for the challenge. At interface 940, the user can record over a track or create their own track, and input the track name and (optionally) lyrics. At interface 942, the user can review the content being uploaded for the challenge. At interface 944, the user can invite specific users 946 to participate in the challenge. At interface 948, the timeline includes challenges that users can participate in. Users may be able to purchase, lease, or download the audio content based on the creator's terms. The challenges are not active until two pieces of audio content are uploaded. Users in the system 100 community and invited users can be notified once the challenge is active. The system 100 can create an automatic, real-time ranking of the audio content based on the selections made by the users in a similar manner to that described for visual content.

Figure 19:
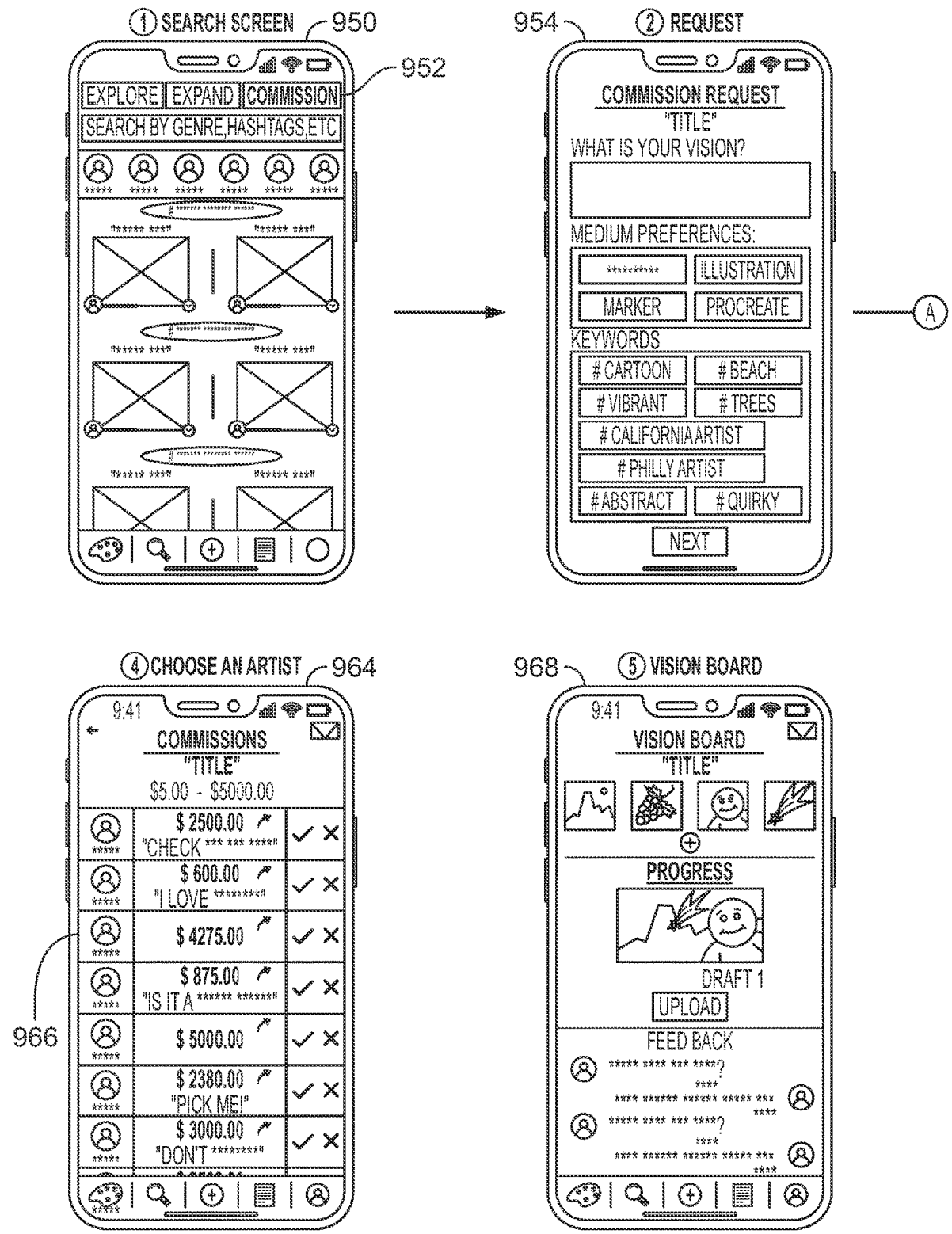
FIG. 19 is a flowchart illustrating a user interface with a commissions selection within an exemplary creative content interface system of the present disclosure.
Figure 19:
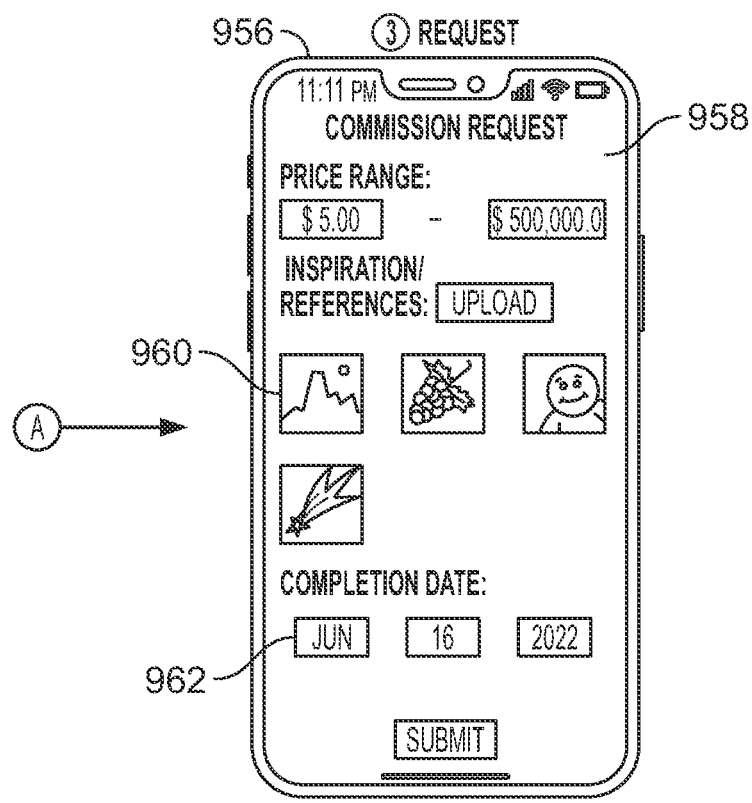

FIG. 19 is a flowchart illustrating a user interface with a commissions selection within the system 100. In particular, users can indicate on their profile that their commissions are opened or closed for creating content for other users. This option simplifies the commissions/art buying process for buyers. At interface 950, the user can select the collaboration/commission button 952 to initiate the process. At interface 954, the user can enter details regarding the commission request, such as a brief description of the art/visual they are commissioning for purchase, the medium of the content (e.g., digital, acrylic painting, colored pencil, charcoal, or the like), and keywords/hashtags that describe their style preference.

At interface 956, the user can enter their price range 958, can upload a visual board in section 960 to assist with the commission, and can enter a deadline in section 962 by which the content should be completed and received by. Based on the submitted request, in interface 964, artists can submit bids on fulfilling the commission request. Section 966 includes a scrollable interface for viewing each of the bids for the commission request. In some embodiments, the interface 964 can automatically populate artists with similar styles and/or medium that match the commission request, and the user can select the artist they wish to create the content from the list. The selected artist can accept or decline the job, and can respond with the requested amount within the user's price range. The user is able to choose one artist based on the responses received in interface 964. Once the artist has been selected and accepted the commission, the interface 968 can be used to create an electronic contract outlining the details of the request, including the check point, deadlines, and agreement to pay certain amounts. The payments can be split into installments—½ of the down payment required to begin the work, and the reminder taken automatically once the commission is completed by the deadline. The interface 968 can be used to provide real-time progress information of the content, and allows for communication with the artist. In some embodiments, if the content is not completed by the agreed upon deadline, the artist may lose 5% of payment for each day after the deadline passes. Commissions can thereby be automated and performed in a more streamlined manner between users/artists.

Figure 20:
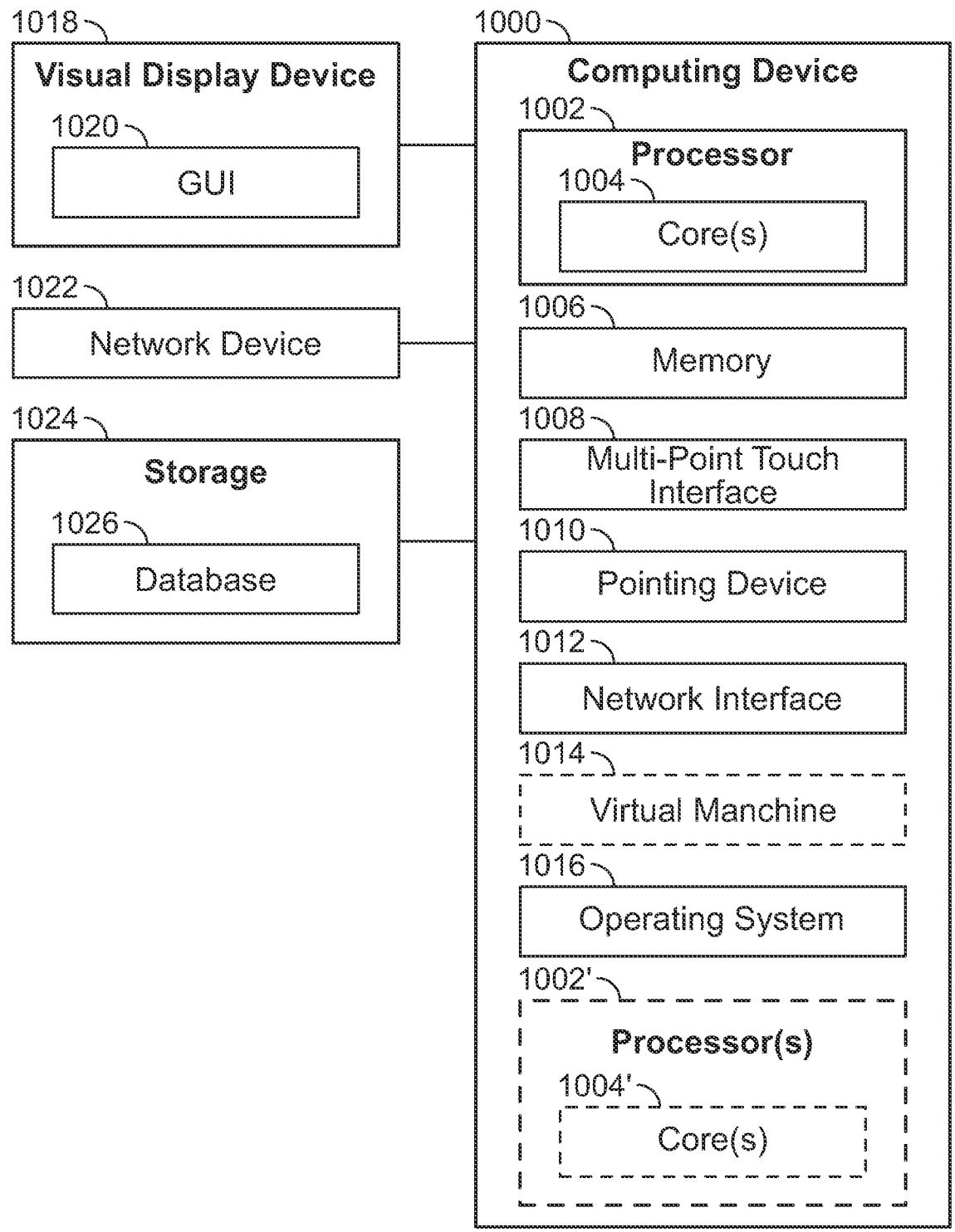
FIG. 20 is a block diagram of a computing device for implementing the exemplary creative content interface system of the present disclosure.

FIG. 20 is a block diagram of a computing device 1000 in accordance with exemplary embodiments of the present disclosure. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store computer-readable and computer-executable instructions or software for implementing exemplary embodiments of the present disclosure (e.g., instructions for operating the processing device, instructions for operating the communication interface, instructions for operating the user interfaces, instructions for operating the central computing system, combinations thereof, or the like). The computing device 1000 also includes configurable and/or programmable processor 1002 and associated core 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device 1000 may be shared dynamically. A virtual machine 1014 may be provided to handle a process running on multiple processors so that the process appears to be using only one computing resource rather than multiple computing resources. Multiple virtual machines may also be used with one processor. Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018 (e.g., a personal computer, a mobile smart device, or the like), such as a computer monitor, which may display at least one user interface 1020 (e.g., a graphical user interface) that may be provided in accordance with exemplary embodiments. The computing device 1000 may include other I/O devices for receiving input from a user, for example, a camera, a keyboard, a scanner, microphone, or any suitable multi-point touch interface 1008, a pointing device 1010 (e.g., a mouse). The keyboard 1008 and the pointing device 1010 may be coupled to the visual display device 1018. The computing device 1000 may include other suitable conventional I/O peripherals.

The computing device 1000 may also include at least one storage device 1024, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the systems described herein. Exemplary storage device 1024 may also store at least one database 1026 for storing any suitable information required to implement exemplary embodiments. For example, exemplary storage device 1024 can store at least one database 1026 for storing information, such as data relating to the creative content, bids, rankings, combinations thereof, or the like, and computer-readable instructions and/or software that implement exemplary embodiments described herein. The databases 1026 may be updated by manually or automatically at any suitable time to add, delete, and/or update one or more items in the databases.

The computing device 1000 can include a network interface 1012 configured to interface via at least one network device 1022 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, a network interface card, a PCMCIA network card, Pa Cl/PCIe network adapter, an SD adapter, a Bluetooth adapter, a card bus network adapter, a wireless network adapter, a USB network adapter, a modem or any other device suitable for interfacing the computing device 1000 to any type of network capable of communication and performing the operations described herein. Moreover, the computing device 1000 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 21:
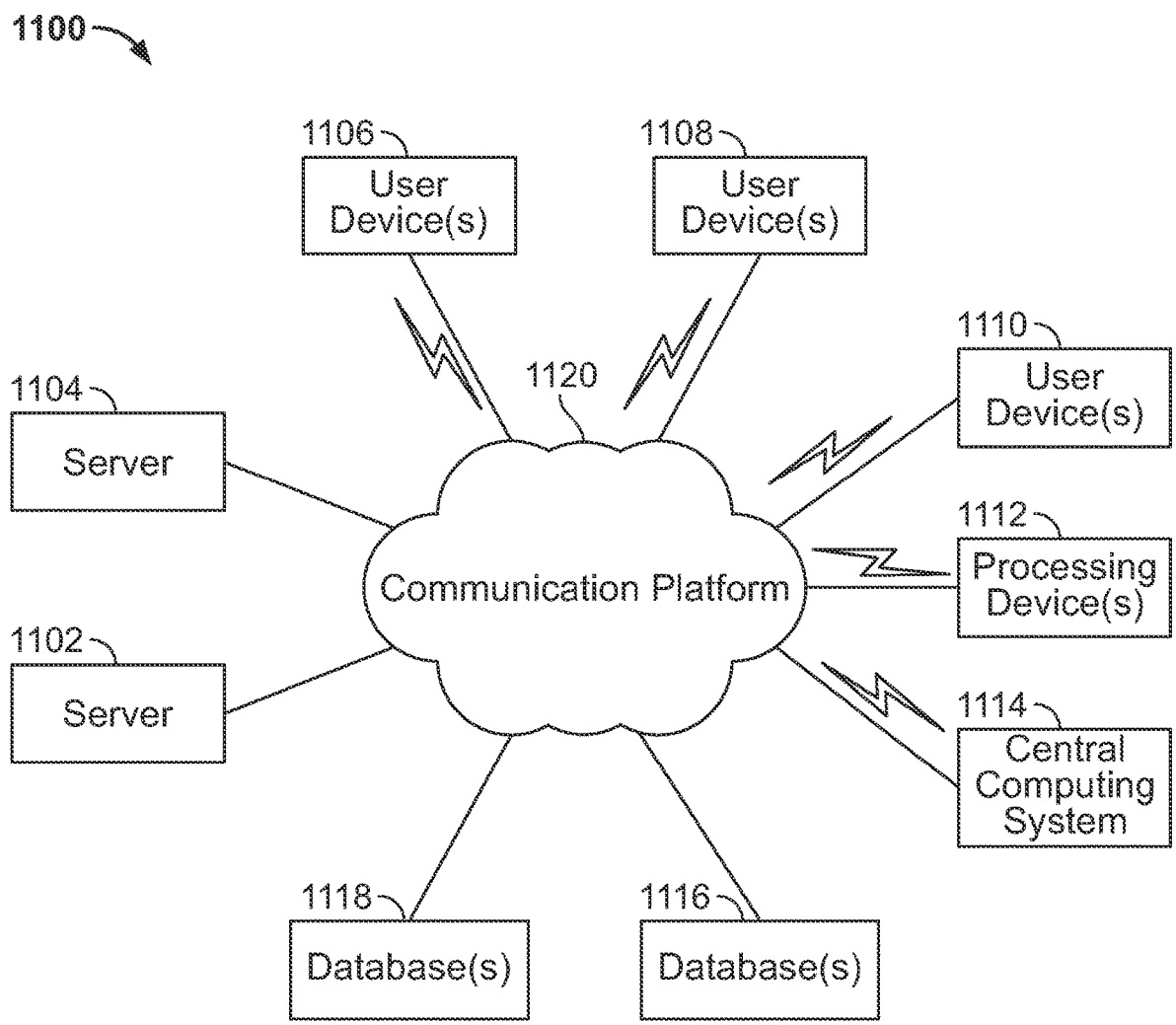
FIG. 21 is a block diagram of a communication system environment associated with the exemplary creative content interface system of the present disclosure.

FIG. 21 is a block diagram of an exemplary communication system environment 1100 for the creative content interface system in accordance with exemplary embodiments of the present disclosure. The environment 1100 can include servers 1102, 1104 configured to be in communication with at least user devices 1106, 1108, 1110, processing devices 1112, and a central computing system 1114 via a communication platform 1120, which can be any network over which information can be transmitted between devices communicatively coupled to the network. For example, the communication platform 1120 can be the Internet, Intranet, virtual private network (VPN), wide area network (WAN), local area network (LAN), and the like. In some embodiments, the communication platform 1120 can be part of a cloud environment.

The environment 1100 can include repositories or databases 1116, 1118, which can be in communication with the servers 1102, 1104, as well as the user devices 1106, 1108, 1110, the processing devices 1112, and the central computing system 1114, via the communications platform 1120. In exemplary embodiments, the servers 1102, 1104, the user devices 1106, 1108, 1110, the processing devices 1112, and the central computing system 1114 can be implemented as computing devices (e.g., computing device 1000). Those skilled in the art will recognize that the databases 1116, 1118 can be incorporated into at least one of the servers 1102, 11504. In some embodiments, the databases 1116, 1118 can store data relating to the creative content, bids, user interfaces, rankings, combinations thereof, or the like, and such data can be distributed over multiple databases 1116, 1118.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A creative content interface system, comprising:
a first electronic device including a first graphical user interface, a first non-transitory computer-readable medium, and a first processing device;
a second electronic device including a second graphical user interface, a second non-transitory computer-readable medium, and a second processing device;

a database in electronic communication with the first and second electronic devices, the database configured to electronically store user registration data and creative content data;

wherein the first processing device is configured to execute instructions stored in the first non-transitory computer-readable medium and the second processing device is configured to execute instructions stored in the second non-transitory computer-readable medium to:
  (i) add creative content to the creative content data by uploading the creative content to a central computing system;
  (ii) interact with the creative content added to the creative content data; and
  (iii) transmit electronic correspondence between the first and second electronic devices; and the central computing system comprising a server in electronic communication with at least the first and second electronic devices and the database, wherein the server executes instructions, which when executed cause the server to:

generate a live electronic timeline interface comprising raffles in which users can participate in and display, on at least the interfaces of the first and second electronic devices, the live electronic timeline interface, wherein the electronic timeline interface is vertically scrollable to view multiple raffles in real time;

generate a real-time feed interface displaying of all the creative content added to the central computing system based on a rank and display, on at least the interfaces of the first and second electronic device, the real-time feed interface;

receive, from the first electronic device, a selected creative content from the added creative content uploaded by the first electronic device and either: i) a raffle transaction type selection and raffle information to sell the selected creative content; or ii) a challenge selection to enter the selected creative content into a challenge;

(A) upon receiving the selected creative content and the raffle transaction type selection:
  (i) modify the live electronic timeline interface to include a raffle of the selected creative content and the raffle information and display, on at least the first and second electronic device, the modified live electronic timeline interface;
  (ii) generate a graphical anonymous selection interface comprising a grid selection with a plurality of blurred or hidden anonymous graphical representation of users who electronically entered the raffle, wherein each user of the users who entered the raffle are represented by separate blurred or hidden anonymous graphical representations, and display, by the first electronic device, the graphical anonymous section interface;
  (iii) receive, from the first electronic device, a selection of a graphical representation of a user from the plurality of blurred or hidden anonymous graphical representation of users displayed on the graphical anonymous selection interface; and
  (iv) in response to the selection of the graphical representation of the user, automatically modify the graphical anonymous selection interface by unblurring the selected graphical representation of the user to reveal a profile image and username of the user who entered the raffle who was represented by the selected blurred or hidden anonymous graphical representation, wherein the user represented by the selected graphical representation wins the raffle;

(B) upon receiving the selected creative content and the challenge selection:
  (i) initiate a competition between at least the selected creative content and a second creative content, wherein the selected creative content is a first creative content;
  (ii) generate and display on electronic devices a challenge graphical interface comprising the first creative content and the second creative content enabling users to select either the first creative content or the second creative content displayed on the challenge graphical interface via a swipe or tap to select a winner between the first creative content and the second creative content;
  (iii) upon receiving the swipe or tap, modifying the challenge graphical interface by removing the loser between the first and second creative content and displaying a third creative content on the modified challenge graphical interface for selection relative to the winner between the first and second creative content;
  (iv) update the rank in real-time of the first, second, and third creative content based on the swipe or tap selection of the winner; and
  (v) modify the real-time feed interface based on the updated rank and display, by at least the first and second electronic device, the modified real-time feed.

2. The system of claim 1, wherein the creative content includes at least one of a painting, a drawing, an audio recording, a video recording.

3. The system of claim 1, wherein the creative content data includes an electronic image of visual creative content or audio creative content, a title associated with the creative content, and a description of the creative content.

4. The system of claim 1, wherein the (ii) interact with the creative content added to the creative content data includes executing a transaction module to establish a transaction type for selling the creative content.

5. The system of claim 4, wherein the transaction type is an auction, a set price, or a price play.

6. The system of claim 4, wherein the transaction type is an auction and the first or second processing device is configured to execute instructions in the first or second non-transitory computer-readable medium to input a customized time period for a length of the auction.

7. The system of claim 6, wherein the customized time period is independently selected and input by a user selling the creative content.

8. The system of claim 4, wherein the transaction type is an auction and the first or second processing device is configured to execute instructions in the first or second non-transitory computer-readable medium to input a max out bid for the creative content, the max out bid bypassing incremental bidding on the creative content and automatically increasing a current bid for the creative content to a dollar amount associated with the max out bid.

9. The system of claim 5, wherein if the transaction type is the auction, the price play, or the set price, the first or second processing device is configured to execute instructions in the first or second non-transitory computer-readable medium to input an offer for the creative content, the offer including a countdown associated with the offer.

10. The system of claim 9, wherein the countdown sets a time period during which the offer input for the creative content is valid.

11. The system of claim 10, wherein if the offer input for the creative content is not accepted, upon completion of the time period, the offer input for the creative content is automatically revoked.

12. A method of creative content interaction, comprising:
electronically adding creative content to creative content data by uploading the creative content to a creative content interface system with a first or second electronic device, the creative content interface system including (i) the first electronic device including a first graphical user interface, a first non-transitory computer readable medium, and a first processing device, (ii) the second electronic device including a second graphical user interface, a second non-transitory computer readable medium, and a second processing device, (iii) a database in electronic communication with the first and second electronic devices, the database configured to electronically store user registration data and the creative content data; and (iv) a server in electronic communication with at least the first and second electronic devices and the database;
electronically interacting, by the first or second electronic device, with the creative content added to the creative content data;
transmitting electronic correspondence between the first and second electronic devices;
generating, by the server, a live electronic timeline interface comprising raffles in which users can participate in;
displaying, on at least the interfaces of the first and second electronic devices, the live electronic timeline interface, wherein the electronic timeline interface is vertically scrollable to view multiple raffles in real time;
generating, by the server, a real-time feed interface displaying of all the creative content added to the central computing system based on a rank;
displaying, on at least the interfaces of the first and second electronic devices, the real-time feed interface;
receiving, from the first electronic device, a selected creative content from the added creative content uploaded by the first electronic device and either: i) a raffle transaction type selection and raffle information to sell the selected creative content; or ii) a challenge selection to enter the selected creative content into a challenge;
  (A) upon receiving the selected creative content and the raffle transaction type selection:
    (i) modifying, by the server, the live electronic timeline interface to include a raffle of the selected creative content and the raffle information and displaying, on at least the first and second electronic device, the modified live electronic timeline interface;
    (ii) generating, by the server, a graphical anonymous selection interface comprising a grid selection with a plurality of blurred or hidden anonymous graphical representation of users who electronically entered the raffle, wherein each user of the users who entered the raffle are represented by separate blurred or hidden anonymous graphical representations, and displaying, by the first electronic device, the graphical anonymous section interface;
    (iii) receiving, by the server from the first electronic device, a selection of a graphical representation of a user from the plurality of blurred or hidden anonymous graphical representation of users displayed on the graphical anonymous selection interface; and
    (iv) in response to the selection of the graphical representation of the user, automatically modifying, by the server, the graphical anonymous selection interface by unblurring the selected graphical representation of the user to reveal a profile image and username of the user who entered the raffle who was represented by the selected blurred or hidden anonymous graphical representation, wherein the user represented by the selected graphical representation wins the raffle;
  (B) upon receiving the selected creative content and the challenge selection:
    (i) initiating, by the server, a competition between at least the selected creative content and a second creative content, wherein the selected creative content is a first creative content;
    (ii) generating, by the server, and displaying on electronic devices a challenge graphical interface comprising the first creative content and the second creative content enabling users to select either the first creative content or the second creative content displayed on the challenge graphical interface via a swipe or a tap to select a winner between the first creative content and the second creative content;
    (iii) upon receiving the swipe or tap, modifying, by the server, the challenge graphical interface by removing the loser between the first and second creative content and displaying a third creative content on the modified challenge graphical interface for selection relative to the winner between the first and second creative content;
    (iv) updating, by the server, the rank in real-time of the first, second, and third creative content based on the swipe or tap selection of the winner; and
    (v) modifying, by the server, the real-time feed interface based on the updated rank and displaying, by at least the first and second electronic device, the modified real-time feed.

13. A non-transitory computer-readable medium storing instructions that are executable by a processing device, wherein execution of the instructions by the processing device causes the processing device to:
electronically add creative content to creative content data by uploading the creative content to a creative content interface system with a first or second electronic device, the creative content interface system including (i) the first electronic device including a first graphical user interface, a first non-transitory computer readable medium, and a first processing device, (ii) the second electronic device including a second graphical user interface, a second non-transitory computer readable medium, and a second processing device, (iii) a database in electronic communication with the first and second electronic devices, the database configured to electronically store user registration data and the creative content data; and (iv) a server in electronic communication with at least the first and second electronic devices and the database;
electronically interact with the creative content added to the creative content data;

transmit electronic correspondence between the first and second electronic devices;

generate a live electronic timeline interface comprising raffles in which users can participate in and display, on at least the interfaces of the first and second electronic devices, the live electronic timeline interface, wherein the electronic timeline interface is vertically scrollable to view multiple raffles in real time;

generate a real-time feed interface displaying of all the creative content added to the central computing system based on a rank and display, on at least the interfaces of the first and second electronic device, the real-time feed interface;

receive, from the first electronic device, a selected creative content from the added creative content uploaded by the first electronic device and either: i) a raffle transaction type selection and raffle information to sell the selected creative content; or ii) a challenge selection to enter the selected creative content into a challenge;

(A) upon receiving the selected creative content and the raffle transaction type selection:
  (i) modify the live electronic timeline interface to include a raffle of the selected creative content and the raffle information and display, on at least the first and second electronic device, the modified live electronic timeline interface;
  (ii) generate a graphical anonymous selection interface comprising a grid selection with a plurality of blurred or hidden anonymous graphical representation of users who electronically entered the raffle, wherein each user of the users who entered the raffle are represented by separate blurred or hidden anonymous graphical representations, and display, by the first electronic device, the graphical anonymous section interface;
  (iii) receive, from the first electronic device, a selection of a graphical representation of a user from the plurality of blurred or hidden anonymous graphical representation of users displayed on the graphical anonymous selection interface; and
  (iv) in response to the selection of the graphical representation of the user, automatically modify the graphical anonymous selection interface by unblurring the selected graphical representation of the user to reveal a profile image and username of the user who entered the raffle who was represented by the selected blurred or hidden anonymous graphical representation, wherein the user represented by the selected graphical representation wins the raffle;

(B) upon receiving the selected creative content and the challenge selection:
  (i) initiate a competition between at least the selected creative content and a second creative content, wherein the selected creative content is a first creative content;
  (ii) generate and display on electronic devices a challenge graphical interface comprising the first creative content and the second creative content enabling users to select either the first creative content or the second creative content displayed on the challenge graphical interface via a swipe or tap to select a winner between the first creative content and the second creative content;
  (iii) upon receiving the swipe or tap, modifying the challenge graphical interface by removing the loser between the first and second creative content and displaying a third creative content on the modified challenge graphical interface for selection relative to the winner between the first and second creative content;
  (iv) update the rank in real-time of the first, second, and third creative content based on the swipe or tap selection of the winner; and
  (v) modify the real-time feed interface based on the updated rank and display, by at least the first and second electronic device, the modified real-time feed.

* * * * *